(12) United States Patent
Sauthoff et al.

(10) Patent No.: US 11,713,667 B2
(45) Date of Patent: Aug. 1, 2023

(54) DOWNHOLE TOOL SENSOR GUARD

(71) Applicant: Baker Hughes Oilfield Operations LLC, Houston, TX (US)

(72) Inventors: Bastian Sauthoff, Burgdorf (DE); Alexander Malkov, Hannover (DE)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/478,340

(22) Filed: Sep. 17, 2021

(65) Prior Publication Data
US 2022/0090487 A1 Mar. 24, 2022

Related U.S. Application Data

(60) Provisional application No. 63/080,099, filed on Sep. 18, 2020.

(51) Int. Cl.
*E21B 47/017* (2012.01)
*G01V 11/00* (2006.01)

(52) U.S. Cl.
CPC .......... *E21B 47/017* (2020.05); *G01V 11/002* (2013.01)

(58) Field of Classification Search
CPC ...... E21B 47/01; E21B 47/013; E21B 47/017; G01V 11/002
See application file for complete search history.

(56) References Cited

U.S. PATENT DOCUMENTS

| | | | |
|---|---|---|---|
| 4,940,943 A | 7/1990 | Bartel | |
| 5,212,495 A | 5/1993 | Winkel | |
| 7,436,183 B2 | 10/2008 | Clark | |
| 9,851,465 B2 | 12/2017 | Wang | |
| 10,018,746 B2 | 7/2018 | Okonkwo | |
| 2007/0114040 A1* | 5/2007 | Jamieson | E21B 47/06 166/380 |
| 2010/0175882 A1 | 7/2010 | Bailey | |
| 2011/0074427 A1* | 3/2011 | Wang | G01V 3/28 324/339 |
| 2011/0316542 A1 | 12/2011 | Frey | |
| 2014/0014373 A1 | 1/2014 | Richards | |

(Continued)

OTHER PUBLICATIONS

International Search Report and Written Opinion dated Dec. 29, 2021 in corresponding PCT Application No. PCT/US21/51026.

*Primary Examiner* — Tara Schimpf
*Assistant Examiner* — Yanick A Akaragwe
(74) *Attorney, Agent, or Firm* — Hogan Lovells US LLP

(57) ABSTRACT

A system for covering a sensitive component in a downhole string includes a sub section in the downhole string including a longitudinal axis and a reduced diameter portion along the longitudinal axis. The system also includes a guard element, arranged over the reduced diameter portion. The system further includes a mounting system adapted to axially couple the guard element to the sub section. The mounting system includes a pocket in one of the sub section and the guard element, the pocket including a shoulder. The mounting system also includes a threaded bore in the other of the sub section and the guard element, the threaded bore oriented at least partially parallel to the longitudinal axis of the sub section. The mounting system further includes a fastener engaging the threaded bore through the pocket and axially coupling the guard element to the sub section.

20 Claims, 15 Drawing Sheets

(56) References Cited

U.S. PATENT DOCUMENTS

| | | |
|---|---|---|
| 2014/0368198 A1 | 12/2014 | Espinosa |
| 2015/0315901 A1 | 11/2015 | Whiddon |
| 2017/0044893 A1* | 2/2017 | Derkacz ................ E21B 47/017 |
| 2017/0102478 A1 | 4/2017 | Yang |
| 2019/0154868 A1 | 5/2019 | Pakash |
| 2019/0198966 A1 | 6/2019 | Nguyen |
| 2019/0379114 A1* | 12/2019 | Nguyen ................... H01Q 7/00 |

* cited by examiner

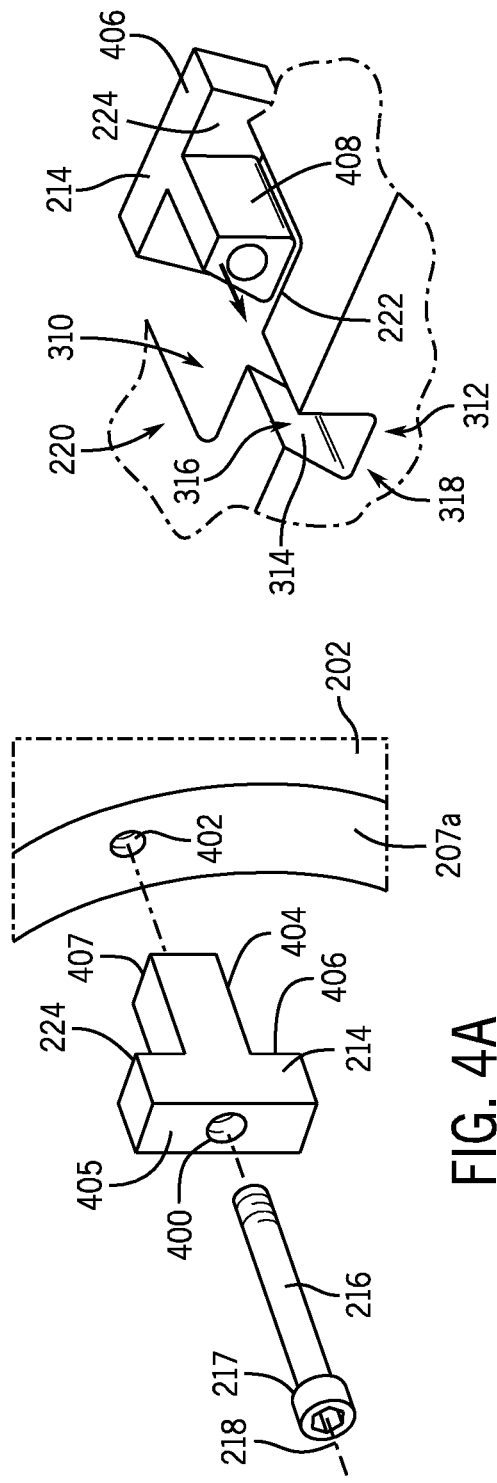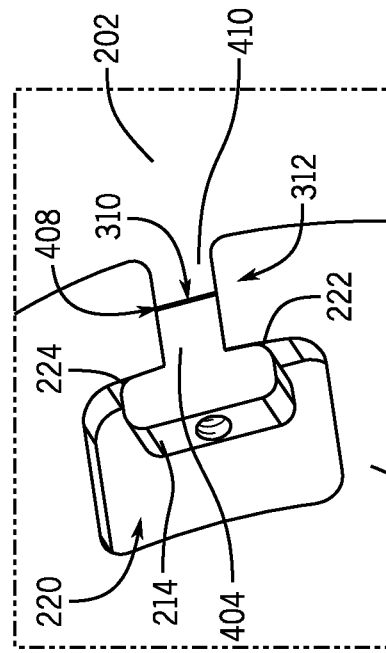

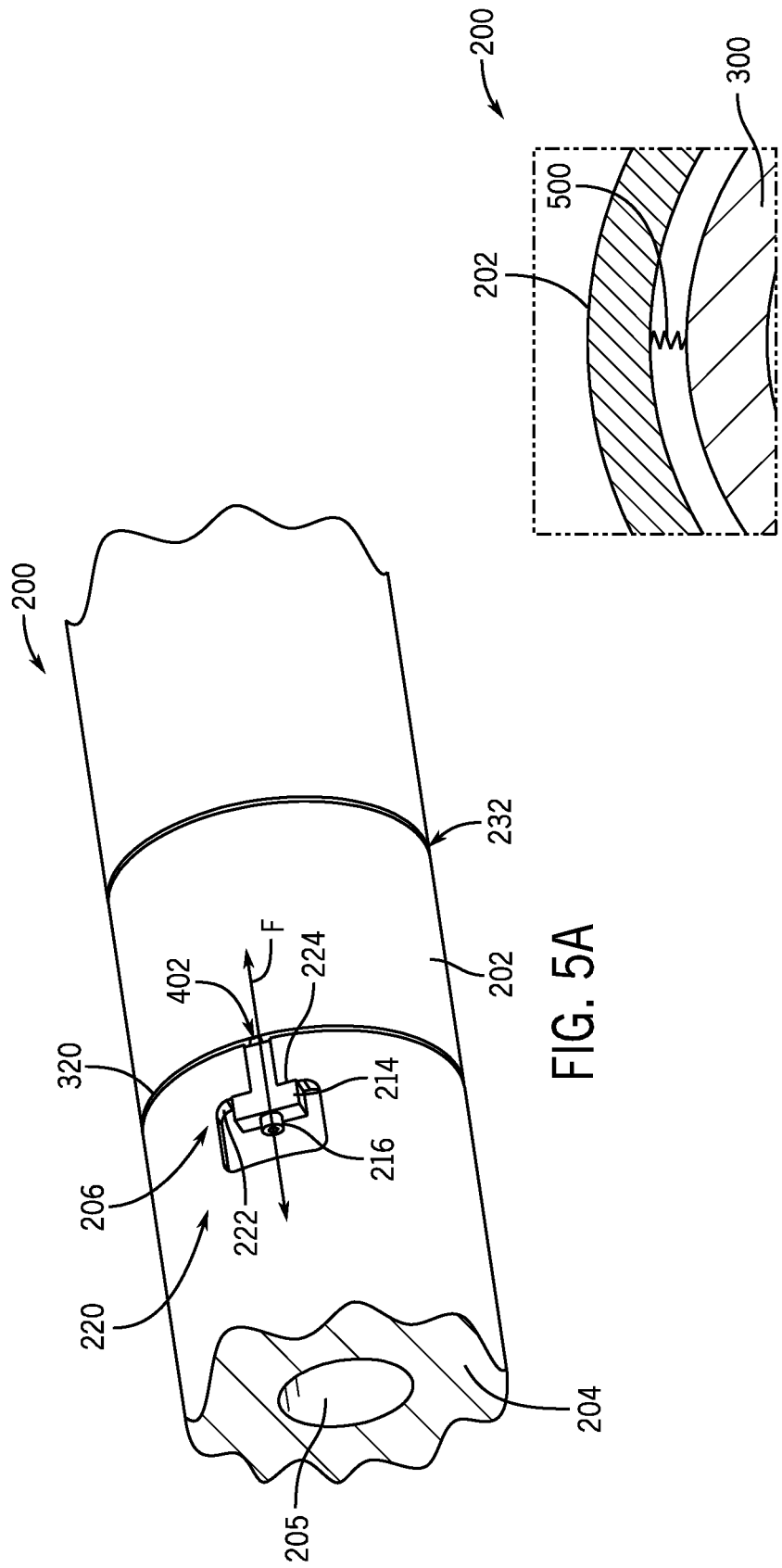

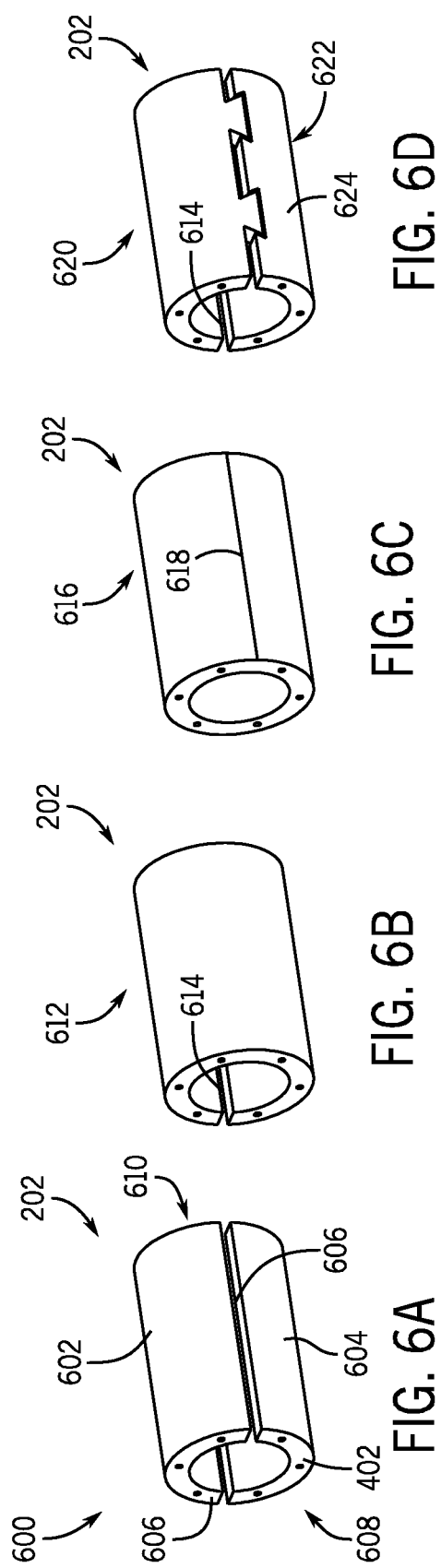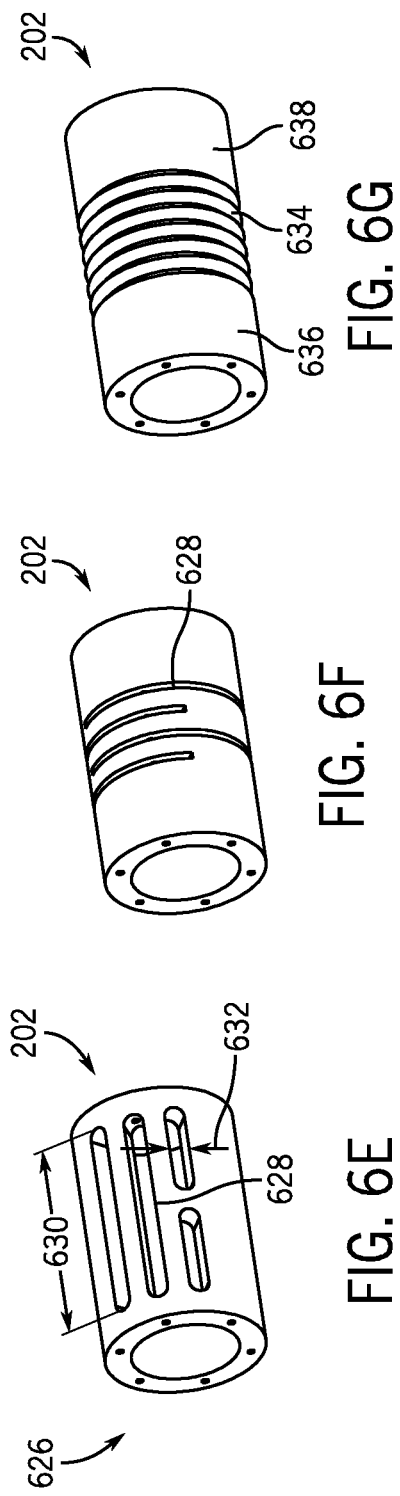

DOWNHOLE TOOL SENSOR GUARD

CROSS-REFERENCE TO RELATED APPLICATIONS

This application claims the benefit of U.S. Provisional Patent Application No. 63/080,099, filed on Sep. 18, 2020, titled "DOWNHOLE TOOL SENSOR GUARD," the full disclosure of which is hereby incorporated herein in its entirety by reference.

BACKGROUND

1. Field of the Disclosure

The present disclosure relates to a system and method for guarding or covering at least a portion of shielding a downhole tool. Specifically, the present disclosure relates to removable guards for components arranged on a downhole tool.

2. Description of Related Art

Oil and gas production may involve downhole measurement operations where various sensors are utilized to collect data for determining one or more wellbore properties. Various sensors may include one or more antennas for sending and/or receiving information. These antennas are subject to wellbore pressures, wellbore temperatures, fluid flow conditions, and potential contact with structure in the wellbore, such as the wellbore wall. Tools may include plates or covers to protect the antennas. The covers have to be fixedly connected to the tool. The covers and the connection of the covers often provide stress locations along a tool string and may be susceptible to breaking due to their design.

SUMMARY

Applicant recognized the limitations with existing systems herein and conceived and developed embodiments of systems and methods, according to the present disclosure, for improved sensor covers.

In an embodiment, a system for covering a sensor component includes a sub section, the sub section including a reduced diameter portion and a guard element, arranged over the reduced diameter portion. The system also includes a mounting system adapted to axially couple the guard element to the sub section. The mounting system includes a locking element, positioned in a pocket formed in the sub section, the locking element being coupled to the guard element. The mounting system also includes a fastener, extending through the locking element, to engage the guard element. The mounting system further includes an aperture formed through in the pocket, the aperture coupling the reduced diameter portion to the pocket, wherein at least a portion of the locking element extends through the aperture.

In an embodiment, a system for covering a sensor component includes a sub section. The system also includes a mounting section formed in a reduced diameter portion of the sub section, the mounting section including a plurality of slots separated by walls. The system includes a first shell segment, comprising a pocket formed in a surface of the first shell segment. The system also includes a second shell segment. The system includes a fastener positioned within the pocket and coupling the first shell segment to the second shell segment, the fastener extending through a slot of the plurality of slots, the fastener engaging an aperture formed in the second shell segment.

In an embodiment, a system for covering a sensor component includes a sub. The system includes a reduced diameter portion positioned between a first sub section and a second sub section and a pocket formed in the first sub section, proximate the reduced diameter portion, the pocket having a aperture extending through the first sub section toward the reduced diameter portion. The system also includes a guard element, positioned within the reduce diameter section, the guard element being coupled to the sub and a mounting system joining the guard element to the sub. The mounting system includes a locking element adapted to extend at least partially through the aperture, the locking element being positioned within the pocket and a fastener, extending through the locking element, and engaging a first end of the guard element, wherein a fastener axis is substantially parallel to a sub axis.

In an embodiment, a system for covering a sensitive component in a downhole string includes a sub section in the downhole string including a longitudinal axis and a reduced diameter portion along the longitudinal axis. The system also includes a guard element, arranged over the reduced diameter portion. The system further includes a mounting system adapted to axially couple the guard element to the sub section. The mounting system includes a pocket in one of the sub section and the guard element, the pocket including a shoulder. The mounting system also includes a threaded bore in the other of the sub section and the guard element, the threaded bore oriented at least partially parallel to the longitudinal axis of the sub section. The mounting system further includes a fastener engaging the threaded bore through the pocket and axially coupling the guard element to the sub section.

In an embodiment, a system for covering a sensitive component in a downhole string includes a sub section in the downhole string including a longitudinal axis and a reduced diameter portion along the longitudinal axis. The system also includes a guard element, positioned within the reduced diameter portion comprising at least one pocket and at least one coupling extension extending radially from an inner surface of the guard element, the at least one coupling extension comprising a threaded hole, the threaded hole at least partially parallel to the longitudinal axis. The system further includes a mounting section formed in a reduced diameter portion of the sub section, the mounting section including an aperture separated by walls. The system includes a fastener positioned within the pocket, extending through the aperture and engaging the at least one coupling extension.

In an embodiment, a system for covering a sensitive component in a downhole string includes a sub section in the downhole string including a longitudinal axis and a reduced diameter portion along the longitudinal axis. The system also includes a guard element, positioned within the reduced diameter portion comprising at least one pocket and at least one coupling extension, the at least one coupling extension extending radially from an inner surface of the guard element, the at least one coupling extension including a hole. The system further includes a mounting section formed in a reduced diameter portion of the sub section, the mounting section including an aperture separated by walls. The system also includes a locking element extending axially through the aperture, the locking element including a threaded hole at least partially parallel to the longitudinal axis. The system includes a fastener positioned within the pocket, extending through the at least one coupling extension, through the aperture and into the threaded hole of the locking element.

In an embodiment, a method for covering a sensitive component in a downhole string, includes positioning the sensitive component within a reduced diameter portion of the downhole string. The method also includes covering at least a portion of the sensitive component via a guard element, the guard element being arranged, at least partially, within the reduced diameter portion, the guard element having at least one pocket and at least one coupling extension, the at least one coupling extension extending radially into the reduced diameter portion from an inner surface of the guard element. The method further includes positioning the at least one coupling extension proximate to an aperture of a mounting section, the aperture receiving a locking element. The method also includes fastening the at least one coupling extension to the locking element via a fastener extending through a threaded hole of the locking element, the fastener being arranged within the pocket.

BRIEF DESCRIPTION OF DRAWINGS

The present technology will be better understood on reading the following detailed description of non-limiting embodiments thereof, and on examining the accompanying drawings, in which:

FIG. 4A is a partial exploded view of an embodiment of a locking element, in accordance with embodiments of the present disclosure;

FIG. 4B is a partial exploded view of an embodiment of a mounting system, in accordance with embodiments of the present disclosure;

FIG. 4C is a partial exploded view of an embodiment of a mounting system, in accordance with embodiments of the present disclosure;

FIG. 5A is a perspective view of an embodiment of a guard element arranged on a tool section, in accordance with embodiments of the present disclosure;

FIG. 5B is a cross-sectional view of an embodiment of a guard element arranged on a tool section, in accordance with embodiments of the present disclosure;

FIGS. 6A-6G are perspective views of embodiments of guard elements, in accordance with embodiments of the present disclosure;

DETAILED DESCRIPTION

Figure 1:
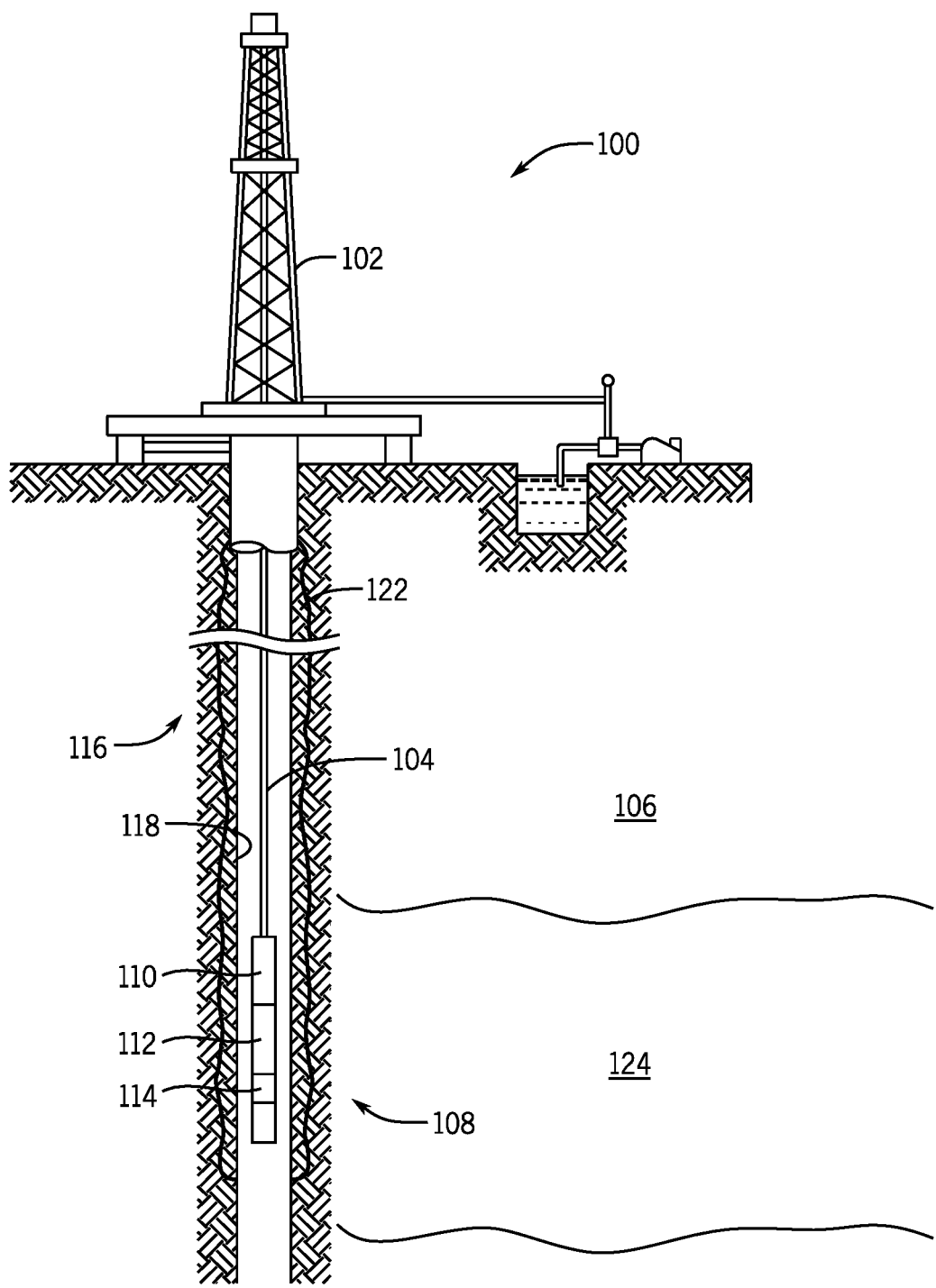
FIG. 1 is a cross-sectional side view of an embodiment of a drilling system, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose. Additionally, references numerals may be reused for similar features between figures, however, such use is not intended to be limiting and is for convenience and illustrative purposes only.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

In some downhole operations, such as logging while drilling (LWD) operations, various tools, such as resistivity tools, may include antennas that are protected against the downhole environment by guards (e.g., guard plates, covers, mechanical shields, shields, guard elements). For example, segmented coverings, such as shells, spanning a portion of a downhole tool string circumference may be joined to a downhole sub (downhole tool), such as by welding or fasteners. Welded guards are not readily removable, while those utilizing fasteners may be. Certain removable guards may include radial bolts to couple the shells to the sub or to couple shells to one another. These guards have problems with mechanical loading, as the forces applied to the fasteners are not in a preferred loading direction of the fastener (e.g., along a longitudinal axis of the fastener). As a result, shear stress may damage the bolts, leading to damage and/or removal of the guards, which may further lead to damage to the antennas. Various embodiments of the present disclosure overcome these drawbacks by providing removable guards that are axially mounted to the sub. Accordingly, the fasteners are loaded along their preferred load direction. Furthermore, the level of pretension is only oscillating. There are no additional loads such as bending or shear. The rotation of the downhole sub in a downhole tool string, such as a bottom hole assembly (BHA), translates to only oscillating axial load (along the longitudinal axis of the fastener). Furthermore, the removability of the guards enables replacement antennas and also installation of different antenna configurations, thereby increasing usability for multiple tool configurations.

Embodiments provide pretension of the fasteners by implementation of axial locking elements located both uphole and downhole of the guard element. As a result, the guard element is pre-tensioned by the fasteners, where the pretension is also transmitted through the guard element. Contact is generated between the locking element and a sub shoulder. In various embodiments, sufficient tension may be utilized to block fretting or movement of the guard element. Furthermore, embodiments may include inserts or sacrificial components to absorb and/or dampen vibrations. The terms uphole, upstream, or upper in this disclosure refers to a direction in the downhole tool string that is oriented toward the earth surface, while downhole, downstream, lower refers to the opposite direction in the downhole tool string oriented toward the bottom end of the downhole tool string (e.g. a bit end) or the bottom of a borehole, opposite the surface end of the downhole tool string or the borehole.

In certain embodiments, a single axial locking element or a single fastener may be deployed, for example, to bear against an upstream sub portion. As a result, the guard element may be tightened against a shoulder of the sub upstream the guard element with no pre-tension transmitted through the guard element. In embodiments, a flexible mount may be provided between the guard element and the sub portion downstream the guard. Furthermore, a flexible mount may be positioned radially between the guard and the sub or a gap may be established to prevent radial contact between the guard element and the sub during bending of the tool string. Radial in this disclosure refers to a direction 213 (FIG. 2) perpendicular to the longitudinal axis 212 (FIG. 2) of the tool string, a tool, or a sub.

It should be appreciated that the guard elements may be provided in a variety of different configurations. By way of example, the guard may be half or multi-part segments that are mounted independently or connected to one another. The guard elements may combine to either fully or only partially circumscribe the longitudinal axis of the tool string. Furthermore, the guard elements may include at least one slot or opening that have a variety of different shapes. As will be described below, in certain embodiments, the shape of the slots or openings may be particularly selected based on the sensor or component associated with the slots or openings, such as an antenna configuration, orientation of an antenna dipole moment, shape of a sensor element, such as a gamma sensor, a nuclear sensor, a pressure sensor, or an acoustic sensor. For example, the slot or opening may be shaped to accommodate the components such that the guard element protects the component from the downhole environment, such as from mechanical loads, but still provides an open section, where the component (e.g., an antenna, a pressure sensor, etc.) can get in contact with the downhole environment, such as allowing an electromagnetic field, a radiation, a pressure, or acoustic waves to pass the guard element. Additionally, the guard may include multiple segments otherwise coupled together, for example by welding. Embodiments may also include hinged components of the guard elements, threaded connections (e.g. tangentially oriented screws), or a groove and tongue connection.

Various embodiments include at least one opening within the guard elements in order to establish a connection between the sensor components and the downhole environment. The openings may additionally be filled with materials different from the material forming the guard element. The opening may be utilized to reduce stiffness of the guard element and the different material may include a less stiff material, to provide improved flexibility. Moreover, in embodiments, the guard may include flexible sections, such as contoured sections or reduced wall thickness sections.

FIG. 1 is a schematic side view of an embodiment of a wellbore system 100 including a rig 102 and a drill string 104 (e.g., tool string) extending into a downhole formation 106. It should be appreciated that while various embodiments may be discussed with reference to the illustrated wellbore system 100, other embodiments may include other wellbore systems that may include wirelines, coiled tubing, and the like. Accordingly, discussion with reference to drill strings 104 is for illustrative purposes only. The illustrated drill string 104 is formed from a plurality of tubulars joined together, for example via threads, and extends into the formation 106 to a bottom hole assembly (BHA) 108. In the illustrated embodiment, the BHA 108 includes a plurality of measurement modules, which may also be referred to as subs, or downhole tools such as a core sampling unit 110, a resistivity measurement unit 112, and a nuclear measurement unit 114, a magnetic resonance measurement unit, and an acoustic measurement unit. In various embodiments, the BHA 108 may include additional or fewer units, and further, may be utilized to conduct one or more downhole measurement operations. Additionally, it should be appreciated that the drill string 104 may include various other components, which have been removed for simplicity and clarification with the discussion herein, such as a mud motor, a steering unit, a drilling dynamics measurement unit (inclination, azimuth, vibration, bending). Furthermore, while embodiments may be discussed with reference to drilling operations, in other embodiments the measurements may be conducted during drilling periods, logging periods, intervention periods, and the like.

As illustrated in FIG. 1, in various embodiments a wellbore 116 extends into the formation 106 and includes a borehole sidewall 118 and an annulus 120 arranged between the BHA 108 and the sidewall 118. In certain embodiments, during formation of the wellbore 116, the drill string 104 may include a drill bit that is driven to rotate. In various embodiments, fluid such as drilling mud may be pumped through an inner bore of the drill string 104 and through the drill bit, where the drilling mud leaves the BHA through nozzles and transports drill cuttings through the annulus to the surface. Drilling mud may infiltrate the formation 106 in a near-borehole zone 122.

In various embodiments, the BHA 108 may be utilized to determine the location of a recoverable zone 124 within the formation 106. The recoverable zone 124 may refer to a region of the formation 106 that includes recoverable hydrocarbons. Additionally, while not illustrated in FIG. 1, the wellbore 116 may also be curved or deviated (inclined borehole), and not just straight, thereby providing additional stresses and strains on the drill string 104 while moving through and/or drilling the deviated borehole. The various illustrated tools associated with the BHA 108 may include a sensor that are arranged along a tool. The sensor may include antennas. The tool may include guards that provide protection to the sensor or a portion the sensor from the wellbore environment. Embodiments of the present disclosure are directed toward removable guards that are axially coupled to respective subs and/or one another, to provide improved stress resistance while rotating the drill string. High stress is applied to the drill string in particular while rotating the drill string in a deviated borehole. Rotation in a deviated borehole may apply oscillating bending stresses to complex and sensitive downhole tool components in the BHA, such as a measurement unit.

Drilling tools have sections where sensor components, such as a LWD antenna, are located. The drilling tool and the drilling tool sections, respectively, include a tool body (sub body). To protect these sensor components, one or more guard elements are located in a region of a drilling tool (drilling sub) where the sensor components are located. These guard elements protect the components against the downhole environment, such as contact with the borehole wall while tripping or drilling operation. An axial mounting element couples the guard to the sub in embodiments of the present disclosure. In various embodiments, the axial mounting element includes a locking element and a fastener that is arranged within a pocket of the sub. The locking element extends through the pocket and is secured to the guard via the fastener. Accordingly, axial and radial movement of the guard element is blocked via contact between a sub shoulder and the locking element. Furthermore, the illustrated arrangement also blocks tangential movement (rotational movement around the longitudinal axis of the sub), which may be caused by torsional vibrations, such as high frequency torsional vibration. In other words, a frictional contact may be provided that effects movement in a variety of different directions. It should be appreciated that, in other embodiments, the pocket may be formed in the guard element and the fastener may lead into an axial aperture formed in the sub body. The guard element may either be formed from the same material as the sub or the sub body or may be formed from a different material than the sub or the sub body. The sub body may be formed from steel, stainless steel, Inconel, titanium, or metal alloys. The guard element may be formed from steel, stainless steel, Inconel, titanium, or metal alloys, polypolyetherketone (PEEK), or fiber-reinforced composite material.

Figure 2:
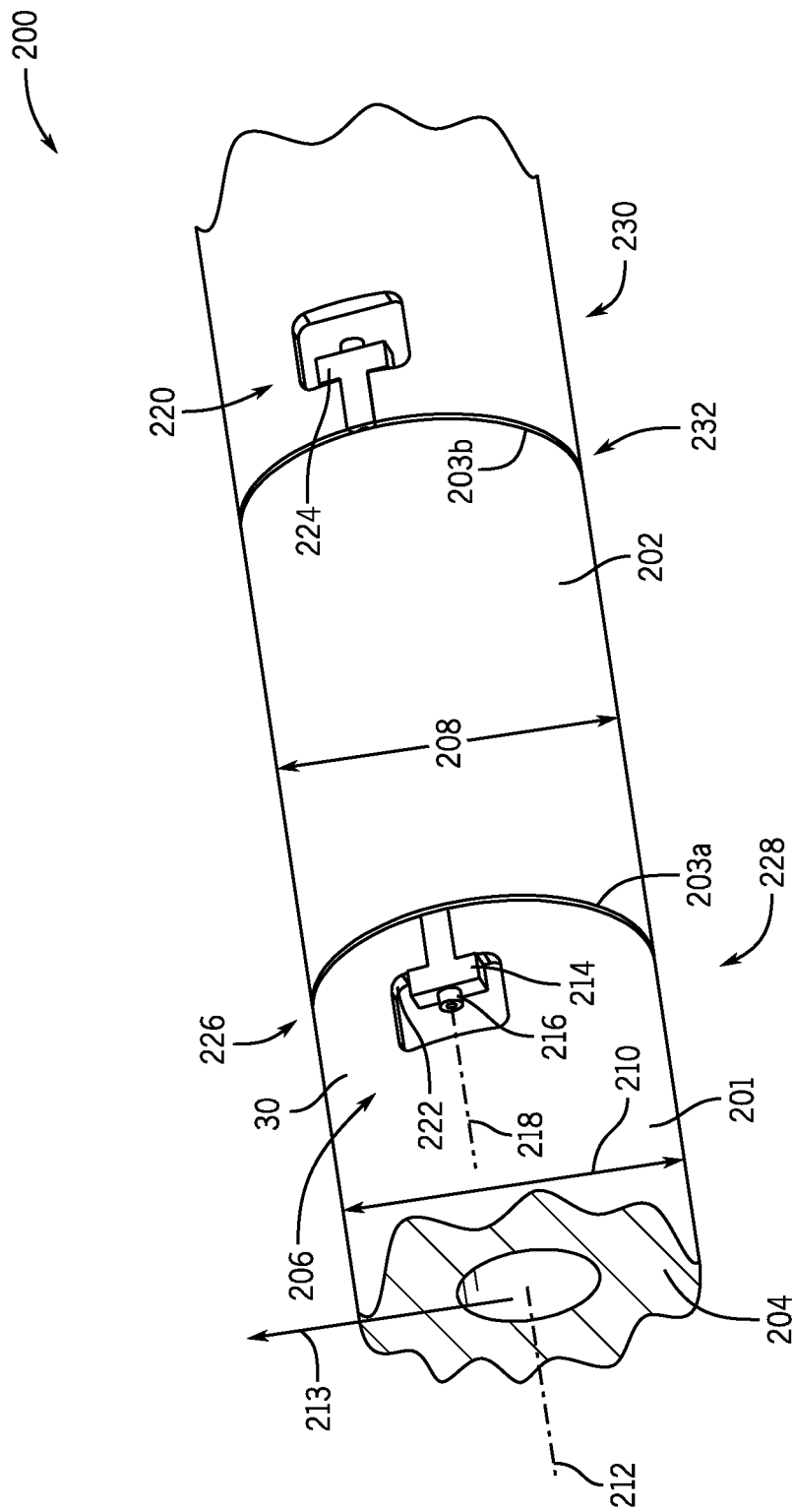
FIG. 2 is a perspective view of an embodiment of a guard element arranged on a tool section, in accordance with embodiments of the present disclosure.

FIG. 2 is a perspective view of an embodiment of a tool section 200 illustrating a guard element 202 (e.g., guard, guard plate, cover, mechanical shield, shield) coupled to a sub 204 via a mounting system 206 (e.g., mounting element). The guard element has a guard length along the longitudinal axis of the sub and a radial thickness in radial direction, perpendicular to the longitudinal axis of the sub. The illustrated guard 202 is arranged circumferentially about the sub 204. As will be described, in various embodiments, the guard 202 can be one part (e.g. a slotted sleeve) or multiple parts (e.g., segmented) around the recess to build a circumferential guard (fully covering the circumference). In other words, the circumferential arrangement may be provided by a multi-segment component that, in combination, forms a circumferential guard. Furthermore, in various embodiments, the guard may be particularly selected to only cover a certain range of the circumference of the sub (not fully covering the circumference. In the illustrated embodiment, an outer guard diameter 208 is substantially equal to an outer sub diameter 210. However, as will be described below, it should be appreciated that the sub 204 may have multiple different diameters, for example, to include a reduced diameter portion where one or more sensors or one or more portions of a sensor may be mounted. Furthermore, in various embodiments, the guard element 202 may be larger or smaller than the sub diameter 210, for example, to provide additional room for components and/or to reduce or increase an outer diameter of the sub.

In the embodiment shown in FIG. 2, the guard 202 is axially mounted to the sub 204 along a longitudinal tool axis or longitudinal sub axis 212. As used here, "axially mounted" refers to utilizing of a coupling element that has an axis substantially parallel to the longitudinal tool axis 212. For example, in the illustrated embodiment, the mounting system 206 includes a locking element 214 and a fastener 216, which may be a bolt. A longitudinal fastener axis 218 is shown as substantially parallel to the tool axis 212. As a result, the force utilized to couple the guard 202 to the sub 204 is arranged along the longitudinal fastener axis 218. This arrangement enables improved force loading over the fastener 216 and reduces shear forces across a body of the fastener 216, which may lead to fatigue and/or failure.

The illustrated locking element 214 is arranged within a pocket 220 formed in an outer surface 201 of the sub 204. The pocket 220 is a recessed portion that includes a radial depth, a circumferential width, and an axial length that may be particularly selected based on design conditions. For example, a pocket length may be selected to enable the fastener 216 and/or the locking element 214 to be positioned within the pocket 220 prior to installation. Furthermore, the pocket 220 may include a depth to enable the locking element 214 and/or the fastener 216 to be positioned within an outer diameter of the tool. The pocket 220 further includes a shoulder 222 that engages a mating shoulder 224 of the locking element 214. As a result, axial movement of the locking element 214 is blocked in at least one direction due to contact between the shoulder 222 and the mating shoulder 224. As noted above, it should be appreciated that reference to blocking axial movement should not be interpreted as only blocking axial movement of the locking element 214. For example, the frictional contact provided may also limit or block radial and/or tangential movement. The shoulder 222 and the mating shoulder 224 are annular shoulders with an extension in radial direction. The shoulder 222 and the mating shoulder 224 are substantially oriented perpendicular to the longitudinal axis 212 of the sub. That is, the normal vector of the shoulders 222 and 224 is substantially parallel to the longitudinal axis 212 of the sub section.

As will be described below, in operation the locking element 214 is arranged within the pocket 220 and the fastener 216 is coupled to the guard element 202 via apertures extending through both the locking element 214 and the guard element 202. Accordingly, axial movement may be locked with respect to the longitudinal tool axis 212, for example, when using a pair of mounting elements on both axial ends of the guard and providing a pre-tension to the fasteners, as described above. In at least one embodiment, the fastener 216 is coupled to the locking element 214 such that a face of the fastener 216 is substantially flush with an end of the locking element 214. That is, an aperture receiving the fastener 216 may be larger than or substantially the same diameter of a bolt head such that the fastener 216 may extend entirely or almost entirely into the locking element 214. It should be appreciated that dimensions of the fastener 216 and/or associated apertures may be particularly selected based, at least in part, on anticipated design conditions.

In various embodiments, an interface 226 is formed between the guard element 202 and the sub 204. In certain embodiments, the guard element 202 is positioned to contact the sub 204 at both upstream 228 and downstream 230 ends of the guard. However, it should be appreciated that, in various embodiments, one or more gaps 232 may be formed between the guard element 202 and the sub 204. That is, respective ends of the guard element 202 may not be drawn into contact with the sub 204, as will be described below.

Figure 3:
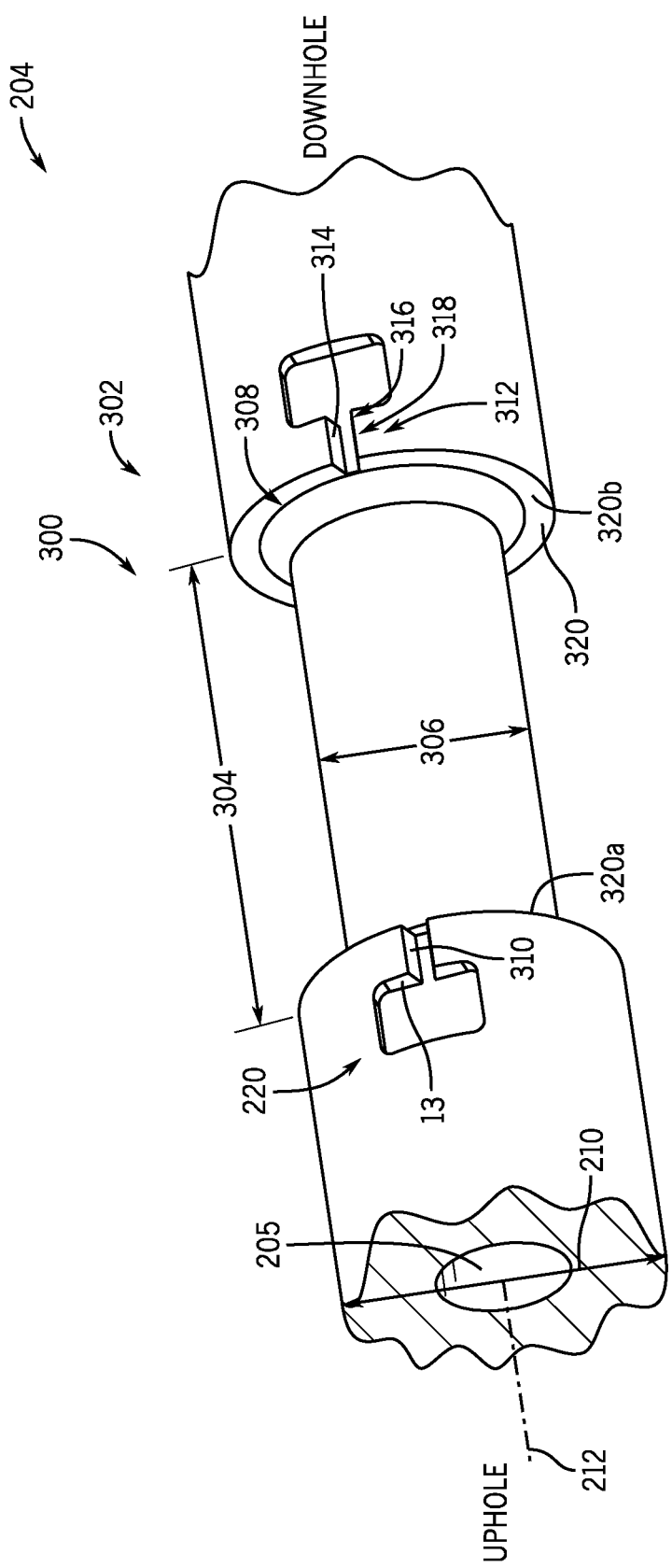
FIG. 3 is a perspective view of an embodiment of a tool sub with a reduced diameter portion, in accordance with embodiments of the present disclosure.

FIG. 3 is a perspective view of the sub 204 illustrating a reduced diameter portion 300 (e.g., reduced diameter section) formed along a section 302 in the outer surface 201 of the sub 204. It should be appreciated that the sub 204 may be any reasonable length and, moreover, that a reduced diameter length 304 may also be any reasonable length. Additionally, there may be multiple reduced diameter portions 300. Furthermore, the reduced diameter portion 300 may extend between one or more subs 204, in other embodiments, however, for clarity herein, the reduced diameter portion 300 is described with reference to the single sub 204. The diameter reduction of the reduced diameter portion depends on the dimensions of the sensor or the sensor portion that is housed in the reduced diameter portion. In a drilling tool that includes an inner bore 205, the radial extend of the reduced diameter cannot be larger than the outer diameter of the sub minus the diameter of the inner bore. The minimum extend of the diameter reduction is the radial thickness of the guard, assuming that the outer diameter of the guard equals the outer diameter of the sub.

In the illustrated embodiment, the reduced diameter portion 300 has a reduced diameter 306 that is less than the sub outer diameter 210. This reduced diameter portion 300 may form a region to receive one or more sensors associated with a downhole tool, for example, one or more antennas. The reduced diameter portion 300 may include a variety of different elements or elevations in order to facilitate installation. For example, a tapered section 308 is shown in FIG. 3, however, this tapered section 308 is for illustrative purposes only and in various embodiments there may be a sudden diameter change between adjacent sections of the reduced diameter portion 300. That is, a substantially planar or vertical edge may be positioned at a transition between the sub diameter 210 and the reduced diameter 306. Moreover, it should be appreciated that the tapered section 308 may be different shapes, such as arcuate, linear, three-center curve, or combinations thereof. The tapered section 308 may serve as a stress reduction feature. It should be appreciated that additional structure may also be provided within the reduced diameter portion 300, such as mounting brackets, clips, and the like. Accordingly, embodiments shown in FIG. 3 are for illustrative purposes and have been simplified.

Further illustrated in FIG. 3 is the pocket 220 that includes an aperture 310 extending through the pocket 220 and into the reduced diameter portion 300 (e.g., extending to the open area associated with the reduced diameter portion 300). In other words, the aperture 310 provides access to the reduced diameter portion 300 through the pocket 220. For example, in embodiments, the locking element 214 may extend, at least partially, through the aperture 310 to facilitate a connection between the guard element 202 and the sub 204. In this embodiment, the aperture 310 includes an aperture profile 312, which is illustrated as having innerwardly (relative to the radial direction 213 in the tool) tapered walls 314. That is, a circumferential aperture opening 316 at an outer radial end of the aperture is larger than a circumferential aperture opening 318 at an inner radial end of the aperture. This arrangement is for illustrative purposes and other embodiments may include a variety of different profiles to facilitate installation and coupling of the locking element 214 and/or the guard element 202. For example, the opening 318 may be larger than the opening 316. Furthermore, the aperture 310 may be closed in radial direction (closed radial portion), thereby blocking radial movement of the locking element 214 after at least a portion extends through the aperture 310.

The reduced diameter portion 300 also includes annular stop shoulders 320a, 320b at each end of the longitudinal length 304 of the reduced diameter portion (upper stop shoulder 320a and lower stop shoulder 320b). The stop shoulders 320a/b are annular shoulders oriented substantially perpendicular to the longitudinal axis 212 of the sub. As noted above, in various embodiments, the stop shoulders 320 may be brought into contact with axial ends (upper end of the guard element 203a and lower end of the guard element 203b) of the guard element 202. The axial ends 203a/b of the guard element include annular guard shoulders 207a/b (FIG. 4A) on the axial ends 203a/b. A pre-tension applied to the fasteners results in contact between the stop shoulders 320a/b and the guard shoulders 207a/b that secure the guard element 202 to the sub 204. However, in embodiments, a gap 232 may be formed between one or both of the stop shoulders 320 and the axial ends 203a/b of the guard element 202. The gap may be formed circumferentially around the longitudinal axis 212 of the sub 204. A gap width is oriented parallel to the longitudinal axis 212 of the sub 204. Additionally, a first end of the guard element 202 maybe in contact with a first stop shoulder of the reduced diameter portion 300, while a second end is not in contact with a second stop shoulder of the reduced diameter portion 300. Advantageously, in this embodiment, there are no threads or other receiving components formed in the sub 204. For example, the stop shoulders 320a/b do not include threaded receptacles, but only the apertures 310. This arrangement beneficially transfers threads or other fastening components over to the guard element 202, which may be considered a removable and replaceable component (e.g., a lower cost component easier to replace than the sub 204). As a result, replacement or removal of the guard elements is enabled with reduced cost and time while the axial fixation of the guard element 202 on the sub and the axial orientation of the mounting system 206 avoids or reduces significantly bending and shear stresses on the mounting system 206 and the included components. Reduced bending and shear stresses result in increased reliability of the mounting system and in result the reliability of the whole system. It should be appreciated that in various embodiments the stop shoulders 320a/b or other portions of the sub 204 may include threaded elements or receiving components.

FIG. 4A is a partial exploded view of an embodiment of the locking element 214 engaging the guard element 202 via the fastener 216. The fastener 216 is illustrated as a threaded bolt in the illustrated embodiment that extends through an aperture 400 formed in the locking element. The aperture may be a hole or a bore. The hole may be threaded or unthreaded. In at least one embodiment, the aperture 400 has a diameter that is greater than a diameter of the fastener 216. That is, the fastener 216 may be installed within the aperture 400 such that an end of the fastener 216 is substantially planar with an end of the locking element 214. In at least one embodiment, the aperture 400 may have a diameter that is greater than at least a first portion of a diameter of the fastener 216, but that is less than a diameter of at least a second portion of the fastener 216, such that a portion of the fastener 216 abuts the face of the locking element 214 when installed. The fastener 216 is aligned with a threaded hole 402 in the guard element 202. As noted above, threads may be formed in the replacement components (e.g., the guard element 202, the locking element 214, etc.) without forming threads on the sub 204, which may improve longevity by transferring components subject to wear to cheaper, easily replaceable components. In operation, the locking element 214 is arranged within the pocket 220 and the fastener 216 extends through the aperture 400 engage the threaded hole 402, thereby securing the locking element 214 to the sub 204 and the guard element 202. The fastener includes a shoulder 217 that engages a shoulder 405 in the locking element on the upstream end of the locking element. The locking element 214 includes a shoulder 407 at the downstream end. The shoulder 407 at the downstream end of the locking element engages the guard shoulder 207a at the upstream end of the guard. In an alternative embodiment the shoulder 217 in the fastener engages directly with an upstream shoulder in the pocket. For a mounting system 206 oriented at the downstream side of the guard element the orientation of the shoulders is opposite to the orientation of the shoulders in a mounting system located upstream the guard element, upstream transforms into downstream and downstream transforms into upstream. It should be appreciated that reference to a threaded hole is for illustrative purposes and that other embodiments may include different configurations, such as interference fits, locking members, spring loaded pins, and the like. As a result, the threaded hole 402 is shown as an example of a mechanism to enable coupling components. In certain configurations, the longitudinal axis 218 of the fastener is parallel to the longitudinal axis 212 of the sub. However, an angle between the longitudinal axis of the fastener and the longitudinal axis 212 of the sub is possible. In case the longitudinal axis of the fastener is inclined with respect to the longitudinal axis of the sub, the shoulders in the force transition path F (FIG. 5A) (fastener to locking element (217 to 405), locking element to sub (224 to 222), locking element to guard element (407 to 207a), or sub to guard element (320a to 207a)) should as well be inclined accordingly. The longitudinal axis of the fastener may form an angle with the longitudinal axis of the sub of approximately 1 to 3 degrees, approximately 1 to 5 degrees, approximately 1 to 10 degrees, approximately 1 to 15 degrees, approximately 1 to 20 degrees, approximately 1 to 30 degrees, or approximately 1 to 45 degrees. At least a part of the shoulders in the force transition pass may be inclined accordingly. That is, the normal vector of the inclined shoulders are parallel to the inclined longitudinal axis of the fastener and form the same angle as the longitudinal axis of the fastener with the longitudinal axis of the sub. The same applies to the aperture in the locking element 400 and the threaded hole 402 in the guard. In case the fastener is inclined with respect to the longitudinal axis of the sub, the locking element may also be inclined. There is no fastener 216 in the mounting system 206 that is oriented substantially in radial direction and there is no shoulder in the mounting system that has a normal vector oriented substantially in radial direction.

The locking element 214 includes an elongated body portion 404, substantially oriented along the longitudinal axis 212 of the sub and coupled to a head 406 substantially oriented perpendicular to the longitudinal axis 212 of the sub and substantially oriented perpendicular to the radial direction of the sub and having a larger width in circumferential direction than the elongated portion 404, thereby forming the mating shoulder 224 that engages the shoulder 222 of the pocket 220. In various embodiments, the locking element 214 also includes a mating profile with respect to the aperture profile 312. For example, the mating profile of the locking element 214 may conform to the aperture profile 312 to facilitate engagement. Additionally, it should be appreciated that the aperture profile 312 and mating profile of the locking element 214 may be particularly selected to provide additional benefits, such as blocking radial movement of the guard element 202.

To mount the guard element 202 on the sub 204, pretension can be established by implementation of the locking elements 214 located uphole and downhole of the guard element 202. As a result, the guard element 202 is pre-tensioned by the fasteners 216 and the pre-tension force is transmitted through the guard element 202. In certain embodiments, contact is generated at the stop shoulders 320a/b. To avoid fretting on the stop shoulders 320a/b and/or guard shoulders 207a/b of the guard element 202 during bending of the drill string, the pre-tension is applied with a value that contact status of the shoulders 320 is locked during bending.

FIG. 4B is a partial exploded view of an embodiment of the locking element 214 engaging the sub 204 at the pocket 220. In this embodiment, the aperture 310 has a triangular shape in a cross-section perpendicular to the longitudinal axis of the sub 212, including outwardly (relative to the radial direction 213 in the tool) tapered walls 314. That is, the circumferential opening 316 at the outer radial end of the aperture is smaller than the circumferential opening 318 at an inner radial end of the aperture. As a result, radial movement of the locking element 214 and the fastener 216, and therefore the guard element 202, is blocked. For example, the illustrated locking element 214 includes a mating profile 408 along at least a portion of the body 404 of the locking element. As a result, the locking element 214 may extend through the aperture 310 and conform to the aperture profile 312. That is, the elongated body portion 404 of the locking element is also tapered, wherein the taper conforms with the taper in the aperture. As will be appreciated, in various embodiments, the locking element 214 may be installed such that the head 406 is drawn into contact with the pocket 220, thereby bringing the shoulder 222 into contact with the mating shoulder 224. It should be appreciated that, in various embodiments, the respective profiles 312, 408 may be different than those illustrated in FIG. 4B. Additionally, in various embodiments, the profiles 312, 408 may include features that provide interference between movement in various directions. Furthermore, it should be appreciated that the opening 316 may be closed off, therefore forming an opening or aperture extending through the sub that is bounded on all sides. The tapered walls in the aperture may extend along the whole longitudinal length of the aperture or only along a portion of the longitudinal length of the aperture. The tapered walls avoid loss of the locking element 214 into the wellbore in case of a lose fastener 216.

FIG. 4C is a partial detailed view of an embodiment of the locking element 214 engaging the sub 204 at the pocket 220. As noted above, the aperture profile 312 illustrated in FIG. 4C is different from the profile of FIG. 4B, in that the respective profiles 312, 408 are substantially rectangular. In this embodiment, the guard element 202 includes an axial extension 410 at one of the axial ends that is positioned within the aperture 310. Within the aperture 310, the axial extension engages the body 404, facilitating coupling of the guard element 202 to the locking element 214, for example via the fastener 216. The engaging of the body 404 of the locking element 214 and the axial extension 410 of the guard element 202 may be within the aperture 310. As will be appreciated, embodiments utilizing the configuration shown in FIG. 4C may receive further resistance to circumferential movement of the guard element 202, as well as resistance to axial movement, due to the arrangement within the aperture 310.

FIG. 5A is a perspective view of an embodiment of the tool section 200 wherein a single mounting system 206 is utilized to secure the guard element 202 to the sub 204. In this example, the mounting system 206 is arranged on an uphole side (e.g., closer to the surface). As described in detail above, the mounting system 206 includes the locking element 214 positioned within the pocket 220. The fastener 216 engages the threaded hole 402 of the guard element 202 to secure the locking element to the guard element 202. The mating shoulder 224 may be brought into engagement with the shoulder 222, thereby blocking radial and axial movement of the guard element 202 in at least one direction. Furthermore, in embodiments, the end of the guard element 202 and with it the guard shoulder 207a is brought into contact with the stop shoulder 320 on the upstream side of the reduced diameter portion 300. However, as opposed to previous configurations, the embodiment of FIG. 5A does not include pre-tension through the guard element 202, which may form the axial gap 232 and/or may include a gap material. Further embodiments may also include a radial gap between the guard element 202 and the reduced diameter portion 300 to facilitate bending. The axial gap may be filled with a material having certain properties, such a mechanical, electrical, magnetic, nuclear, and acoustic properties. The gap may avoid direct contact between the guard element and the sub section in bending situations, reducing mechanical stress. The gap may be filled with a material with specific electrical properties to improve the measurement quality of a resistivity sensor. The gap may be filled with a material specific acoustic properties to improve the measurement quality of an acoustic sensor. The material in the gap may be Polyetheretherketone (PEEK), rubber, elastomer, or epoxy resin.

FIG. 5B is a cross-sectional side view of the tool section 200 where a flexible mount 500 is arranged radially between the guard element 202 and the sub 204. This portion of the sub 204 is at the reduced diameter portion 300, as described above. The illustrated flexible mount 500 may include a spring, rubber, elastomer or other resilient element that enables, reduces or dampens radial movement of the guard element 202 with respect to the sub 204. As a result, bending of the downhole tool may be enabled without driving the guard element 202 into the sub 204, which could potentially damage components or decrease the working life of the components. However, it should be appreciated that in other embodiments the flexible mount 500 may be replaced by a radial gap between the guard element 202 and the sub 504. The radial gap may be filled with air.

FIGS. 6A-6G are perspective views of embodiments of the guard element 202 including various features that may be incorporated individually or in combination. Accordingly, it should be appreciated that while embodiments may include a single feature, various embodiments may combine two or more features. Each of the guard elements 202 may be incorporated with the axial mounting methods described herein. Various embodiments may include features such as segmented guards, split guards, guard section coupling systems, slotted sleeves, guard openings, guard flexible sections, and the like.

FIG. 6A includes the guard element 202 in a segmented configuration 600. The split forms a first shell segment 602 (e.g., first guard segment) and a second shell segment 604 (e.g., second guard segment), each of the shells 602, 604 spanning approximately 180 degrees. It should be appreciated that this arrangement is one example of split shell configuration, and that in other embodiments, the guard element 202 may be split into 3 parts, 4 parts, 5 parts, 6 parts, or any reasonable number of parts. Furthermore, it should be appreciated that each part may not be the same size. For example, a configuration with 3 parts may include one segment that is approximately 180 degrees, like the first shell segment 602, while the other segments are 90 degrees, as an example. In this embodiment, each segment 602, 604 includes a pair of circumferential ends 606, where the segments 602, 604 may be brought together to from a full guard arrangement around the tool. In certain embodiments, as will be described below, additional components may be utilized to fasten the segments together. Also illustrated in FIG. 6A, one or more threaded holes 402 are positioned in and around each axial end 608, 610 (e.g., end face, guard shoulder 207a/b) of the respective segments 602, 604. In certain embodiments, each of the one or more threaded holes 402 is used to secure the respective segments 602, 604. In embodiments with more than one threaded hole a variety of different mounting positions are possible (e.g., the guard may not be aligned in a certain location).

FIG. 6B is a perspective view of the guard element 202 in split configuration 612 where the guard element 202 includes an opening with a circumferential width or discontinuation 614 extending along an axial length of the guard 302. The illustrated split configuration 612 may provide flexibility during operation. In some embodiments, the guard element 202 may be partially deformed to install on the tool string, for example, by expanding the guard element 202 at the opening 614.

FIG. 6C is a perspective view of the guard element 202 in a composed configuration 616 where a seam 618 illustrates a joining process, such as a welding operation or a groove and tongue connection, to join segments around the circumference of the tool. For example, the composed configuration 616 may include segments, such as the segments 602, 604 that are then attached together after being positioned on the tool, such as via a welding process or the groove and tongue connection.

FIG. 6D is a perspective view of the guard element 202 in a hinged configuration 620. As shown, a hinge system 622 is positioned at a first circumferential end 624 opposite the opening 614. As a result, the illustrated segments 602, 604 may pivot about the hinge system 622, thereby enabling installation around the tool. As noted above, in various embodiments, there may be multiple hinge systems to couple multiple segments together.

FIG. 6E is a perspective view of the guard element 202 in a coupling configuration 626 that includes passages 628 to facilitate coupling with the component being protected by the guard element. The illustrated passages 628 include a variety of axial passage lengths 630 and passage circumferential widths 632, which may be particularly selected based on a variety of different factors. The passages 628 may be aligned with the configuration of various sensing components in a sensor, such as antennas, to facilitate coupling components to the tool. It should be appreciated that, in various embodiments, the passages 628 may also be filled or otherwise surrounded by additional material, which may have a reduced hardness or stiffness compared to the guard element 202. For example, one or more inserts may be utilized to provide further protection after connections have been formed. The material in the passages may have certain electrical, magnetic, acoustic, optical or mechanical properties. The material may for example be optimized to allow passage of an electromagnetic field, an magnetic field, an acoustic wave, an optical wave, a nuclear radiation (neutron, gamma), or may be prepared to withstand pressure or mechanical shocks. The material in the passages may be an electrical conductive or an electrical non-conductive material. It may have a certain magnetic permittivity or a certain dialectic constant. The material in the passages may be Polyetheretherketone (PEEK), rubber, elastomer, or epoxy resin. The material in the passages may allow fluids to pass, such as a meshed material, a grid, or a skeletal structure.

FIG. 6F is a perspective view of the guard element 202 illustrating the passages 628 arranged in a 90 degree rotation when compared to the passages 628 of FIG. 6E. The passages are substantially oriented along the circumference of the tool. In various embodiments, these passages 628 may also facilitate connection to the components, as well as reducing the stiffness of the guard element 202. For example, the passages 628 may reduce an axial stiffness of the guard element 202 or may reduce a bending stiffness of the guard element 202. As noted above, the passages 628 may include a variety of different axial lengths 630 and circumferential widths 632, and moreover, may be filled with additional materials. The axial length may extend about a certain angle around the circumference of the sub. The angle may be between approximately 10 degrees to approximately 180 degrees, approximately 10 degrees to approximately 90 degrees, approximately 10 degrees to approximately 50 degrees, or approximately 10 degrees to approximately 30 degrees.

FIG. 6G is a perspective view of the guard element 202 illustrating a flexible section 634 between respective end segments 636, 638. For example, the flexible section 634 may be a bellows type section having ridges or folds to facilitate expansion and contraction in response to external forces. In other embodiments, the flexible section 634 may be made of a different material than the end segments 636, 638 to enable additional flexion, for example, by using a less stiff material, such as rubber, elastomer, or titanium. As a result, bending of the tool may be accommodated for while maintaining the presence of the guard element 202.

Figure 7:
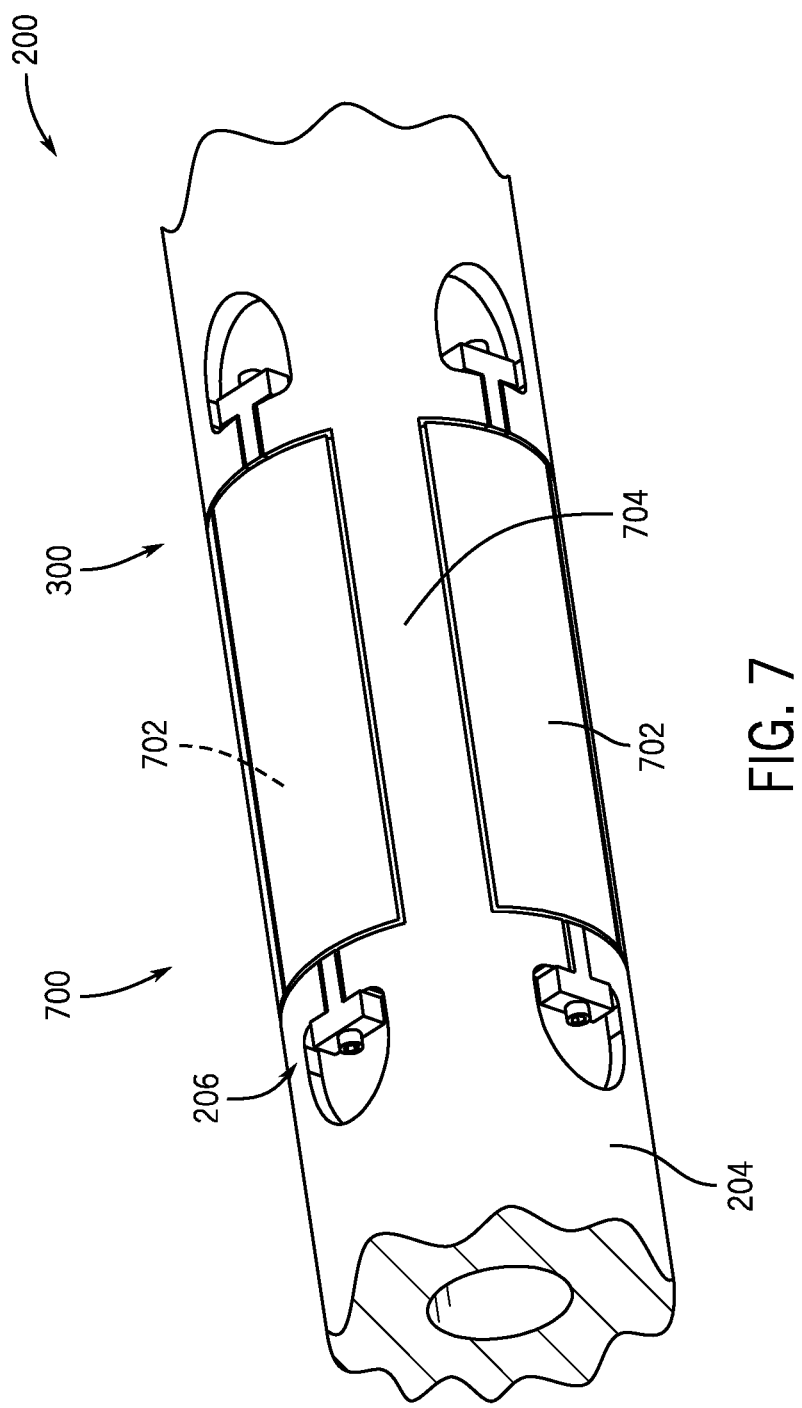
FIG. 7 is a perspective view of an embodiment of a guard element arranged on a tool section, in accordance with embodiments of the present disclosure.

FIG. 7 is a perspective view of an embodiment of the tool section 200 that includes the sub 204 having one or more recesses or hatches 700 positioned to receive guard segments 702. In the illustrated embodiment, the reduced diameter portion 300 does not extend circumferentially about the tool section 200, like the configuration shown in FIG. 3, but rather, one or more ribs 704 of the sub 204 extend along the length of the sub 204. Recesses have a circumferential width and an axial length. The one or more recesses 700 are positioned at different regions about the tool axis 212, and include individual guard elements 202, shown here as the segments 702, that are arranged within the respective recesses 700. As described above, these segments 702 are coupled to the sub 204 via the mounting elements 206. Accordingly, it should be appreciated that the one and more segments 702 share features previously described herein, such as the threaded hole 402 and the like.

Figure 8:
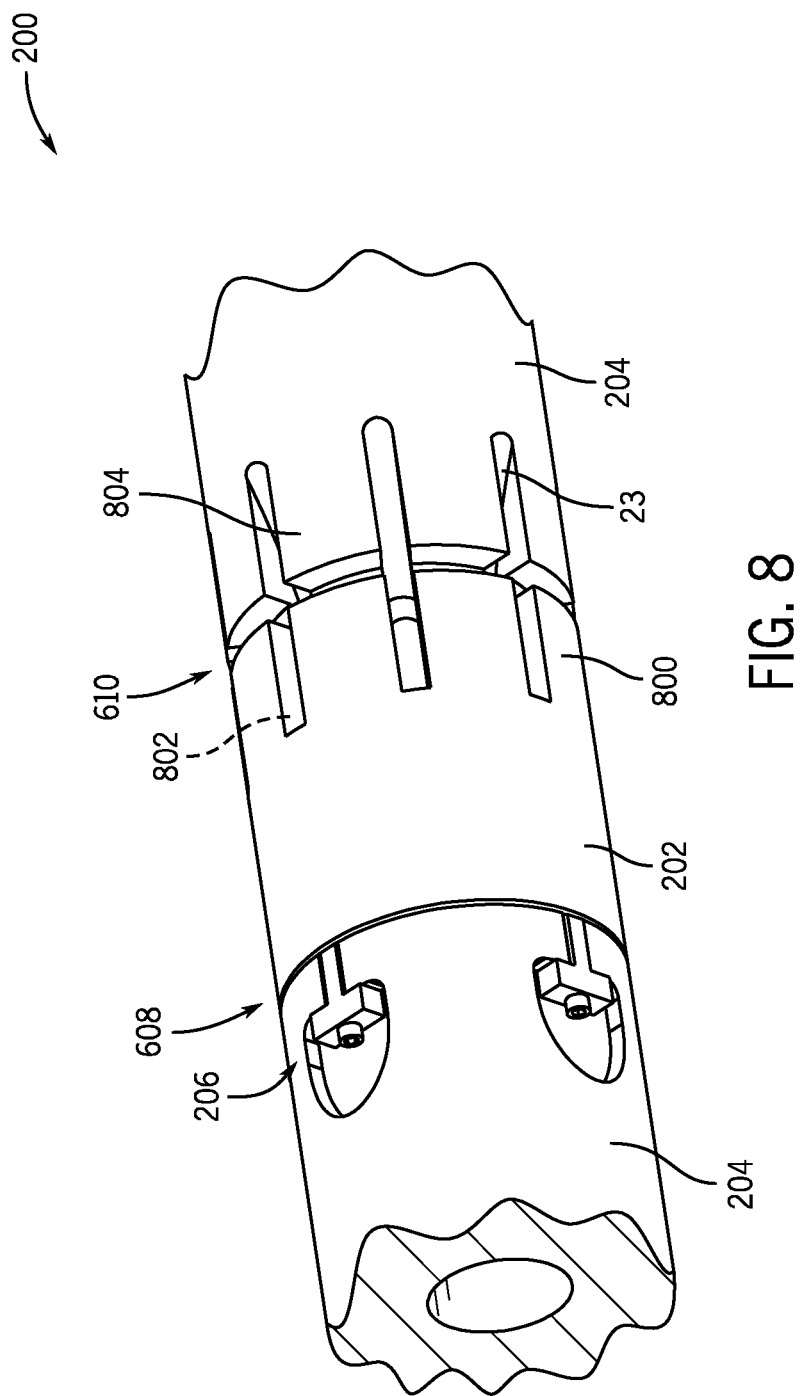
FIG. 8 is a perspective view of an embodiment of a guard element arranged on a tool section, in accordance with embodiments of the present disclosure.

FIG. 8 is a perspective view of an embodiment of the tool section 200 including the guard element 202 having a plurality of cover features 800 arranged at the end 610, opposite the end 608 that engages with the mounting system 206. The cover features 800 are arranged as fingers that are separated by spaces or apertures 802. The spaces are oriented in longitudinal direction. However, it should be appreciated that other layouts may be utilized with embodiments of the present disclosure. The spaces 802 may extend radially through the guard element into the reduced diameter portion 300 where the sensor components are arranged. As illustrated, the mounting elements 206 are utilized to secure the guard element 202 into position.

In the illustrated embodiment, the cover features 800 at the end 610 are positioned to align with mating features 804 formed in the sub 204. That is, there is not a second set of mounting elements 206 at the end 610. However, it should be appreciated that in other embodiments the mounting elements 206 may be at the end 610 and the cover features 800 may be at the end 608. Accordingly, in various embodiments, the cover features 800 are utilized to cover only an axial portion of the region housing the sensor components in the reduced diameter portion 300. The mating features 804 allow for placement of parts of the sensor, such as for example ferrite elements. The ferrite elements may be best placed axially beyond the actual sensor (e.g. antenna). The placement of ferrites in the mating features may improve the properties of the sensor.

Figure 9:
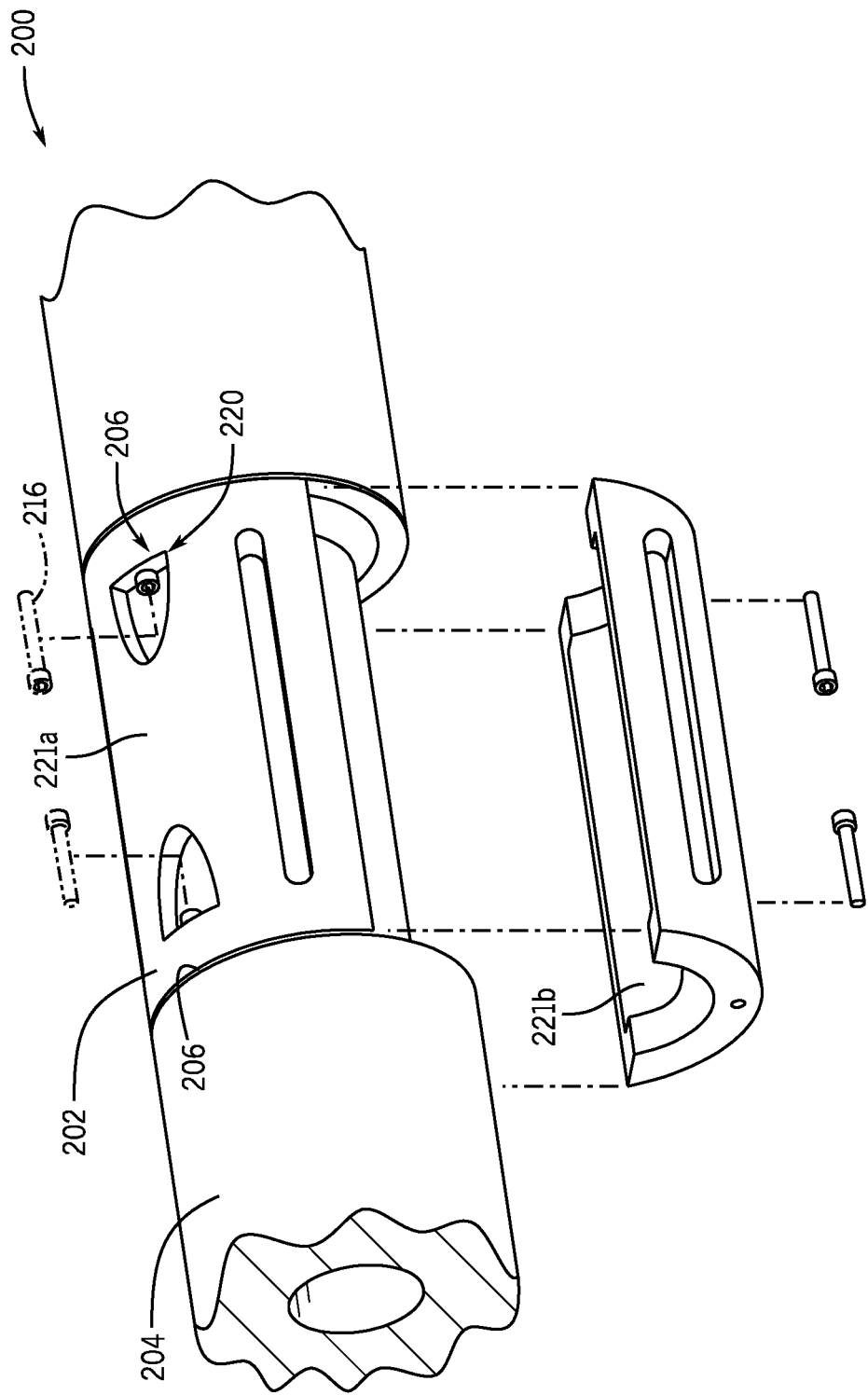
FIG. 9 is a perspective view of an embodiment of a guard element arranged on a tool section, in accordance with embodiments of the present disclosure.

FIG. 9 is a perspective view of an embodiment of the tool section 200 where the mounting system has moved to the guard element 202. Accordingly, various features described herein may be shifted to the sub 204, such as the threaded hole 402. The guard element has an outer surface 221a and an inner surface 221b. Furthermore, the illustrated pocket 220 may be formed in the outer surface 221 in the guard element 202. It should be appreciated that the pocket in the guard may be hole extending fully through the guard element in radial direction. This alternative arrangement still provides axial loading of the fasteners 216. Moreover, it should be appreciated that, while the illustrated embodiment includes the fastener 216 having a head that is larger than an aperture, in other embodiments the head may be smaller than or substantially the same size as the aperture, and as a result, the fastener 216 may be flush with an end face within the pocket or may extend into the aperture. The pocket 220 in the mounting system by be a hole, or a bore extending through the guard element 202.

Figure 10:
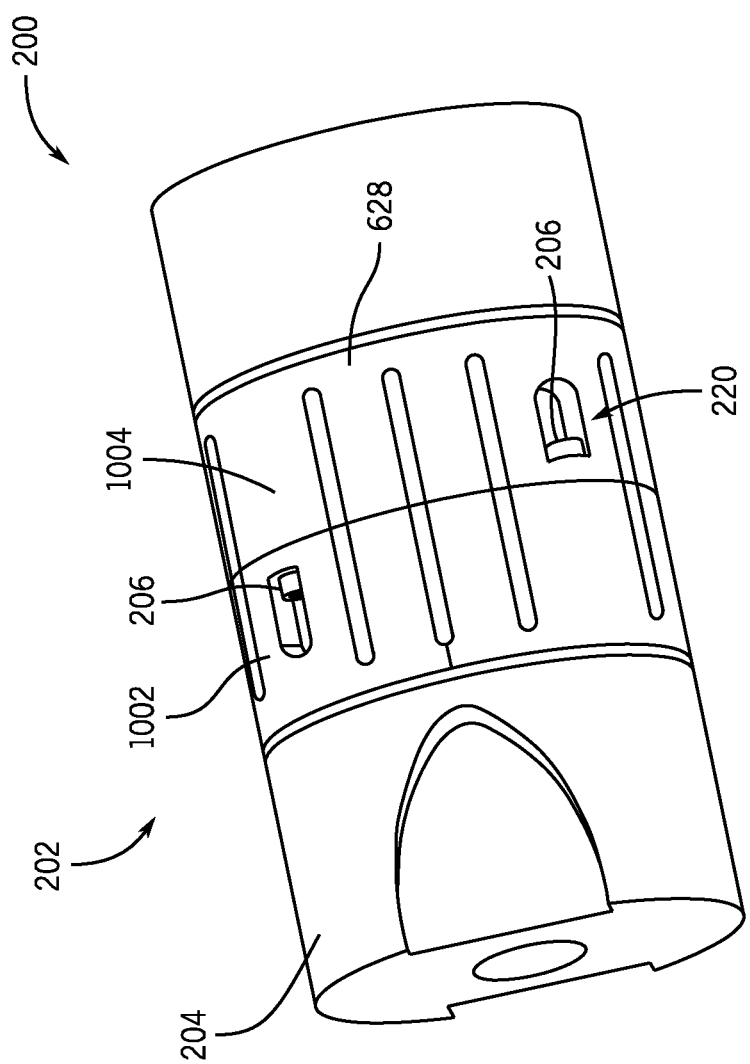
FIG. 10 is a perspective view of an embodiment of a guard element arranged on a tool section, in accordance with embodiments of the present disclosure.

FIG. 10 is a perspective view of an embodiment of the tool section 200 including the guard element 202 arranged such that the mounting elements 206 are utilized to couple different segments 1002, 1004 of the guard element 202 together. In the illustrated embodiment, the first shell segment 1002 includes the mounting system 206, such as the pocket 220 that receives the locking element 214 to engage the second segment 1004. As a result, the second segment 1004 may include the threaded hole 402, among other elements to secure the fastener 216, to secure the first segment 1002 to the second segment 1004. Additionally, other features such as the passages 628 are illustrated in both the first and second segments 1002, 1004. As shown, these features are aligned, which may be indicative of alignment of various elements corresponding to the mounting system 206, such as the position of the threaded hole 402 in the guard element 202 (FIG. 6A).

FIG. 10 further illustrates the mounting system 206 also positioned on the second segment 1004 to engage the first segment 1002. It should be appreciated that in various embodiments each of the segments 1002, 1004 may span a different circumferential distance (angle). For example, they may be half segments (e.g., 180 degrees) or quarter segments (e.g., 90 degrees), or any other range or combination thereof. The segments 1002, 1004 may also have different axial length. For example, segment 1002 may be shorter in axial extension than segment 1004. The illustrated arrangement may further include the gaps 232 (FIG. 5A) between the guard element 202 and the sub 204, thereby providing space for bending or movement of the guard element 202.

Figure 11:
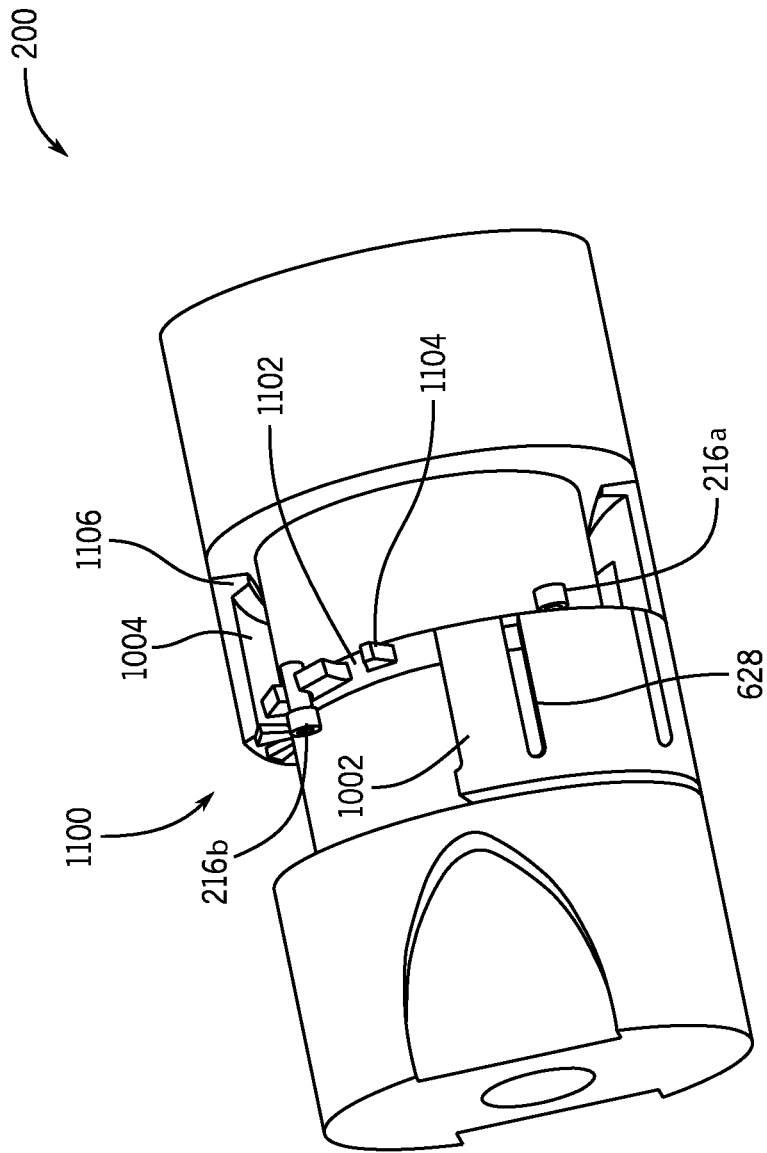
FIG. 11 is a partial perspective view of an embodiment of a guard element arranged on a tool section, in accordance with embodiments of the present disclosure.

FIG. 11 is a perspective view of an embodiment of the tool section 200 in which portions of the segments 1002, 1004 have been removed in order to illustrate a mounting section 1100 arranged within the reduced diameter portion 300. The illustrated mounting section 1100 includes a plurality of slots 1102 separated by walls 1104. The walls 1104 extend from an outer surface of the sub section in the reduced diameter portion 300 in radial direction. All walls together form a circumferential ring of walls around the circumference of the sub section with the reduced diameter portion. The extension of each of the walls in circumferential direction may be bigger than the extension in axial direction. The slots are also referred to as apertures. The slots 1102 together with the walls 1104 form a slot profile each (aperture profile). The mounting section 1100 may be particularly selected in order to receive both the sensor components (not illustrated) and the fastener 216. For example, in certain embodiments, the mounting section 1100 may be utilized to replace the locking element 214.

In various embodiments, the slots 1102 are arranged to correspond to the passages 628 within the segments 1002, 1004, thereby providing access to the sensors, for example coupling or the like. However, it should be appreciated that, in other embodiments, the slots 1102 may not be aligned to provide increased protection for the sensor components.

The segments 1002, 1004 are further illustrated in FIG. 11 as including respective lips 1106 that extend radial innerwardly and that may abut the stop shoulders 320. However, as noted above, there may also be a gap between the lips 1106 and the stop shoulders 320. The lips 1106 may engage the reduced diameter portion 300 to align apertures of the passages 1002, 1004 with the slots 1102 to facilitate coupling via the fastener 216. The lips also provide a mechanical coupling of the sensor components in the reduced diameter portion 300 with the guard elements 202. The lips ensure that no relative movement between the sensor components and the guard elements 202 are possible.

Figure 12:
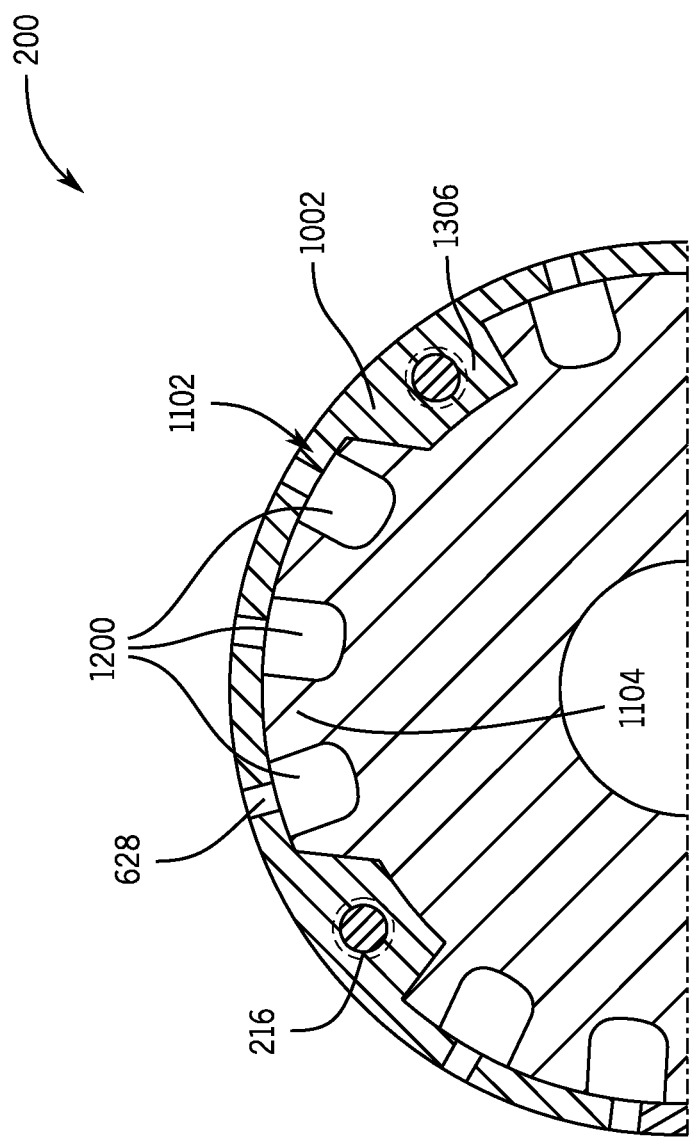
FIG. 12 is a cross-sectional view of an embodiment of a guard element arranged on a tool section, in accordance with embodiments of the present disclosure.

FIG. 12 is a cross-sectional view perpendicular to the longitudinal axis 212 of an embodiment of the tool section 200 illustrating sensor components 1200 arranged within the slots 1102 formed in the mounting section 1100. In this embodiment, the slots 1102 housing the sensor components 1200 are aligned with the passages 628. Furthermore, in the illustrated embodiment, the fastener 216 extends through both the slot 1102 and a coupling extension 1306 in the segment 1002. As a result, radial movement of the segment 1002 may be blocked, while in certain embodiments facilitating axial movement and/or bending of the tool section. The coupling extension may include a threaded hole. While mounting, the fastener engages with a first coupling extension (not shown) in segment 1004. The first coupling extension includes an unthreaded aperture for the fastener to pass through. Then the fastener passes a slot in the mounting section, and engages with a second coupling extension 1306 that includes a threaded hole to secure the fastener. In embodiments both coupling extensions engaging with the fastener may include a threaded hole.

Figure 13:
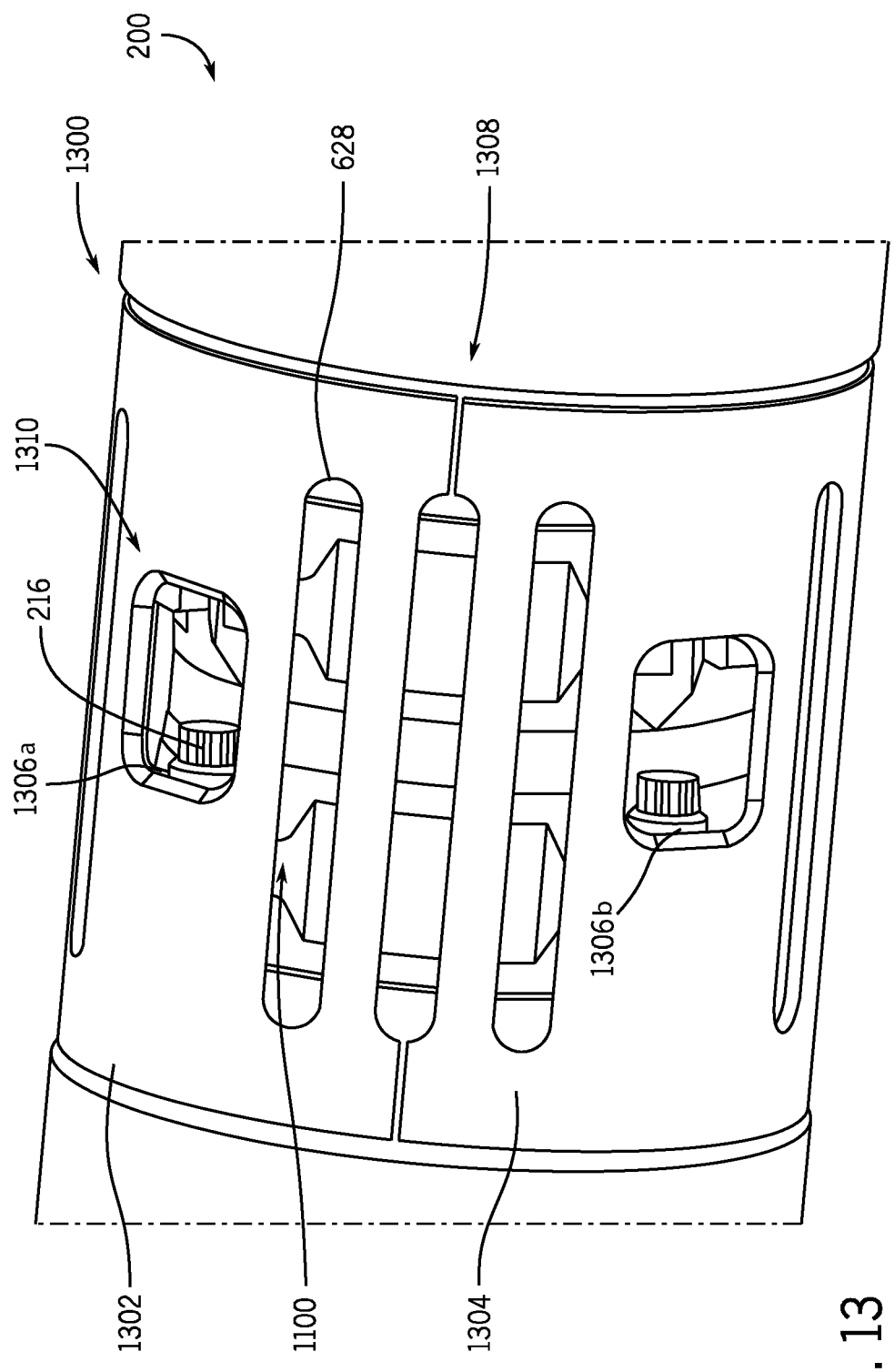
FIG. 13 is a perspective view of an embodiment of a guard element arranged on a tool section, in accordance with embodiments of the present disclosure.

FIG. 13 is a perspective view of an embodiment of a guard element 202 arranged along a tool section 200. As noted above, the guard element 202 may be utilized to protect and/or secure one or more sensors associated with the tool section. The illustrated guard element 202 may be referred to as a segmented guard element 1300, such as the guard element described in FIGS. 6 and 9, in that the guard element 202 includes multiple sections 1302, 1304 (much like the segments 602, 604). In the illustrated embodiment, the first section 1302 and the second section 1304 are arranged proximate one another at an interface 1308, which in this embodiment extends through a passage 628. As indicated above, the passages 628 arranged along the guard element 1300 may provide access to the sensors while still maintaining a protective layer around the sensors. Moreover, as also described, respective widths, lengths, and numbers of passages 628 may be particularly selected based on operating conditions, and as a result, the embodiment including three passages 628 having equal sizes is for illustrative purposes only.

The sections 1302, 1304 of the guard element 1300 are secured to the tool body via one or more fasteners 216, which may engage one or more elements of the mounting element as described above. In this embodiment, the fasteners are arranged within the illustrated voids or openings 1310 (pocket) in the guard elements 1302, 1304 to facilitate access from the outside. As will be described herein, the fasteners 216 may engage one or more elements of the mounting elements 206, for example locking element 214 that interacts with the mounting section 1100, to secure the sections 1302, 1304 in place. As previously indicated, the fasteners 216 may be coupled to apertures having a diameter that is less than, greater than, or substantially equal to one or more portions of the fasteners 216, such that the fasteners 216 may be flush with an end of the locking element 214 and/or may fully extend into the locking element 214. In the illustrated embodiment, a geometry of the voids 1310 is different from the passages 628, however, it should be appreciated that in other embodiments they may be the same. Furthermore, dimensions of the voids 1310 are shown for illustrative purposes and may vary based on a variety of factors, such as a fastener length or the like.

In various embodiments, as noted above, the respective sections 1302, 1304 may include a radial extension 1306 (e.g., coupling extension) that is utilized to secure the sections 1302, 1304 to the tool body, similar to the configuration illustrated in FIG. 12. By way of example, the coupling extension 1306 may extend radially inward from the inner surface of the guard element toward the tool body and include an aperture for receiving the fastener 216 and/or portions of the mounting element 206. In certain embodiments, the coupling extension 1306 may be arranged axially uphole or axially downhole of components of the mounting section 1100, such as the walls 1104a and 1104b, to provide a stopping feature to block axial movement of the guard element. The coupling extension include an aperture or a hole for the fastener to pass through. The hole in the coupling extension may not include threads.

Figure 14:
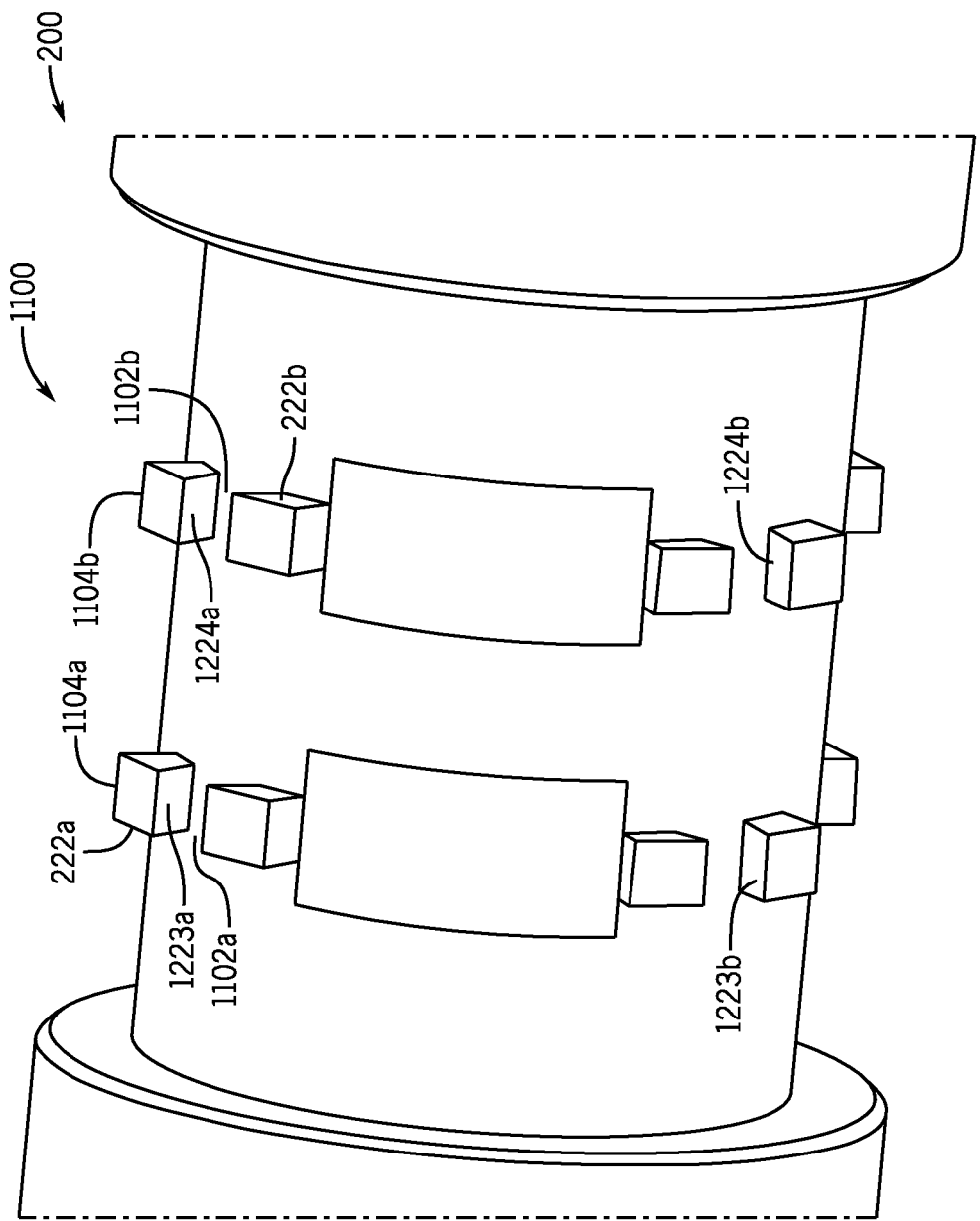
FIG. 14 is a perspective view of an embodiment of a tool section, in accordance with embodiments of the present disclosure.

FIG. 14 is a perspective view of an embodiment of the tool section 200 including the mounting section 1100, which includes the walls 1104a and 1104b and the slots 1102a and 1102b. In this configuration, each of the slots 1102a or 1102b is surrounded by a pair of walls 1104a or 1104b, thereby forming at least a portion of the shoulder 222a or 222b for engaging with one or more mounting elements 206, as noted above. The shoulders 222a and 222b include a normal vector substantially parallel to the longitudinal axis 212 of the sub section. The mounting section 1100 may include one or more circumferential rings of walls. The one or more circumferential rings of walls share one symmetry axis, which may be the longitudinal axis 212 of the sub section. The one or more circumferential rings of walls may include different numbers of walls (e.g., a number of walls 1104a may not be equal to a number of walls 1104b). In one non-limiting example, all the walls in one circumferential ring may extend the same distance in radial direction from the reduced diameter portion 300 and may all have the same axial extension. The walls in different circumferential rings may extend the same distance in radial direction from the reduced diameter portion 300 and may have the same axial extension. The walls 1104*a* and 1104*b* include side walls 1223 and 1224 surrounding the slots 1102*a* and 1102*b*. Each wall comprises two side walls 1223*a*, 1223*b* and 1224*a*, 1224*b*. As noted above, in various embodiments slots 1102*a*, 1102*b* may be arranged circumferentially about the tool body (slots have a circumferential width) and may be arranged in a particularly selected configuration based on design conditions. For example, spaces between the slots 1102*a*, 1102*b* may form mounting areas for various sensors and the like. Furthermore, the slots 1102*a*, 1102*b* may also receive one or more sensors.

Figure 15:
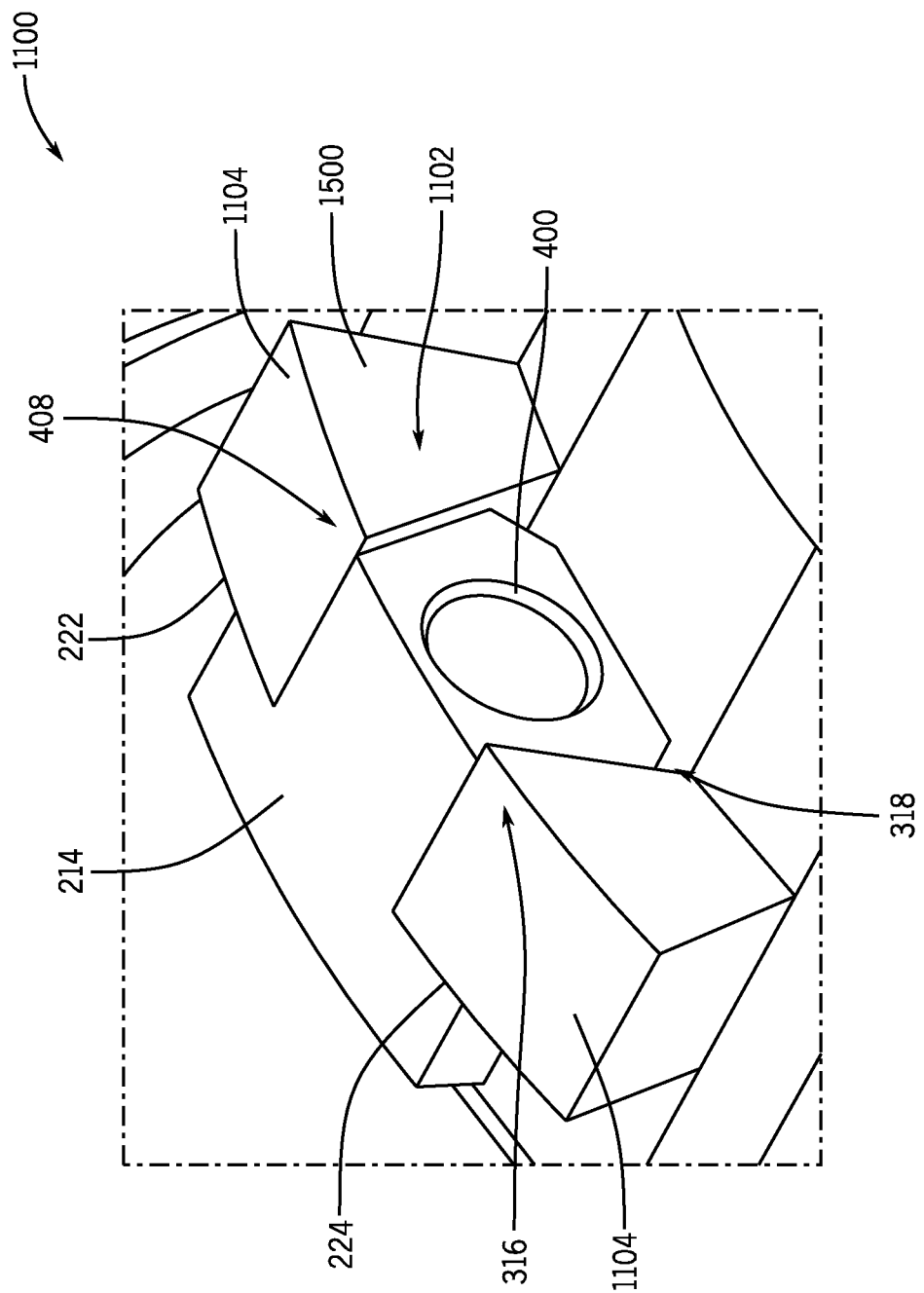
FIG. 15 is a perspective view of an embodiment of a locking element for securing a guard element, in accordance with embodiments of the present disclosure.

FIG. 15 is a perspective view of an embodiment of a portion of the mounting element. A locking element 214 engaging the slot 1102 of the mounting section 1100. As described above, for example with respect to at least FIG. 2, the illustrated locking element 214 extends through the slot 1102 (e.g., the aperture 310) such that the shoulder 222 of the walls 1104 engages the mating shoulder 224 of the locking element 214. Accordingly, the aperture 400 formed in the locking element 214 may receive the fastener 216. As noted, the aperture 400 may have a diameter that is greater than, less than, or substantially equal to one or more portions of the fastener 216 such that the fastener 216 may have an end that is substantially flush with the mounting element 206, that abuts the locking element 214, and/or that extends fully into the locking element 214. In various embodiments, the coupling extension 1306 (not shown) is arranged between the fastener (not shown) and side 1500 of the walls 1104, opposite to the side of the walls 1104 that provide shoulder 222. The coupling extension may also include an aperture to receive the fastener 216, thereby securing the sections 1302, 1304 to the mounting section 1100 and blocking axial and radial movement of the sections 1302, 1304. While mounting, the mounting system, the fastener passes through the opening 1310, through the hole in the coupling extension 1306, passes a slot in the mounting section, and engage with the locking element 214 that includes a threaded hole (not shown) to secure the fastener. The fastener 216 may pass the slot 1102 within the locking element 214. The side of the wall that includes the shoulder 222 may be referred to as upstream side or downstream side of the walls 1104, depending from which side the fastener enters the slot. If the fastener 216 enters the slot 1102 from the downstream side (FIG. 13), the shoulder 222 is on the upstream side of the walls 1104. In this configuration, the downstream side of the walls, opposite the upstream side of the walls, include the side 1500 of the walls 1104 that is abutting on the coupling extension 1306. If the fastener enters the slot from the upstream side, the shoulder 222 is on the downstream side of the walls and the side 1500 is on the upstream side of the walls 1104.

The guard elements 1302, 1304 (e.g., first section and second section) may comprise more than one mounting system, including more than one coupling extension 1306. In a configuration with two mounting systems a first mounting system may be configured as described above, including first walls 1104*a*, first slots 1102*a*, a first locking element 214*a*, a first coupling extension 1306*a*, and a first fastener 216*a* entering the first slot 1102*a* through the first coupling element 1306*a* from the downstream side. The first locking element 214*a* includes a first mating shoulder 224*a* engaging a first shoulder 222*a* on the upstream side of the first walls 1104*a* (FIGS. 13 and 15). A second mounting system (not shown) may be located at a different location on the circumference of the guard element (e.g. approximately 10 degrees to 45 degrees from the first mounting system). The second mounting system may be configured such that a second fastener 216*b* enters a second slot 1102*b* between second walls 1104*b* through a second coupling extension 1306*b* from the upstream side. A second mating shoulder 224*b* on a second locking element 214*b* engages with a second shoulder 222*b* on the downstream side of the walls 1104*b*.

The configuration shown in FIG. 15 shares similarities with that of FIG. 4B in that a mating profile 408 is presented such that radially outward movement is blocked. For example, the opening 318 of the slot 1102 is greater than the opening 316, which blocks movement radially outward. Opening 316 is radially outward from opening 318. The radius from the tool center to opening 318 is smaller than the radius from the radial tool center to opening 316. As a result, when coupled to the sections 1302, 1304, the locking element 214 may block outward radial movement of the guard element 1300.

Embodiments may also be described in view of the following clauses:

1. A system for covering a sensitive component in a downhole string, comprising:
   a sub section in the downhole string including a longitudinal axis and a reduced diameter portion along the longitudinal axis;
   a guard element arranged over the reduced diameter portion; and
   a mounting system adapted to axially couple the guard element to the sub section, comprising:
   a pocket in one of the sub section and the guard element, the pocket including a shoulder; and
   a threaded bore in the other of the sub section and the guard element, the threaded bore oriented at least partially parallel to the longitudinal axis of the sub section; and
   a fastener engaging the threaded bore through the pocket and axially coupling the guard element to the sub section.

2. The system of clause 1, further comprising:
   a locking element, the locking element including an elongated body portion oriented at least partially along the longitudinal axis of the sub section and a head portion oriented at least partially perpendicular to the longitudinal axis of the sub section.

3. The system of clause 1, wherein a fastener axis and the threaded bore are arranged parallel to the longitudinal axis of the sub section.

4. The system of clause 1, wherein the pocket is in the outer surface of the sub section, and the mounting system further comprising:
   an aperture formed through in the pocket, the aperture coupling the reduced diameter portion to the pocket, the aperture including a profile; and
   a locking element extending through the aperture, the locking element including a mating profile, wherein the mating profile corresponds to the profile of the aperture.

5. The system of clause 4, wherein the profile of the aperture includes a tapered wall arranged to block movement of the locking element in a radial direction.

6. A system for covering a sensitive component in a downhole string, comprising:
   a sub section in the downhole string including a longitudinal axis and a reduced diameter portion along the longitudinal axis;

a first guard element positioned within the reduced diameter portion, the first guard element comprising a first coupling extension extending radially from an inner surface of the first guard element, the first coupling extension comprising a threaded hole, the threaded hole at least partially parallel to the longitudinal axis;

a second guard element the second guard element comprising a second coupling extension extending radially from an inner surface of the second guard element, the second coupling extension comprising a hole;

a mounting section formed in a reduced diameter portion of the sub section, the mounting section including an aperture separated by walls; and a fastener positioned within the pocket, extending through the hole of the second coupling extension and the aperture and engaging the first coupling extension.

7. The system of clause 6, wherein a fastener axis is arranged parallel to the longitudinal axis of the sub section.

8. The system of clause 1, wherein the guard element further comprises:
a flexible section.

9. A system for covering a sensitive component in a downhole string, comprising:

a sub section in the downhole string including a longitudinal axis and a reduced diameter portion along the longitudinal axis;

a guard element, positioned within the reduced diameter portion comprising at least one pocket and at least one coupling extension, the at least one coupling extension extending radially from an inner surface of the guard element, the at least one coupling extension including a hole;

a mounting section formed in the reduced diameter portion of the sub section, the mounting section including an aperture separated by walls;

a locking element extending axially through the aperture, the locking element including a threaded hole at least partially parallel to the longitudinal axis; and a fastener positioned within the pocket, extending through the hole in the at least one coupling extension, through the aperture and into the threaded hole of the locking element.

10. The system of clause 9, wherein the locking element comprises:
an elongated body portion oriented at least partially along the longitudinal axis of the sub section; and
a head portion oriented at least partially perpendicular to the longitudinal axis of the sub section.

11. The system of clause 9, wherein a fastener axis is arranged parallel to the longitudinal axis of the sub section.

12. The system of clause 9, wherein the aperture includes a profile and the locking element includes a mating profile, wherein the mating profile corresponds to the profile of the aperture.

13. The system of clause 12, wherein the profile of the aperture is defined by at least one side of the walls, the at least one side of the walls is tapered, wherein the profile of the aperture is arranged to block movement of the locking element in a radial direction.

14. The system of clause 9, wherein the sub section includes a circumference and the guard element covers at least a portion of the circumference of the sub section.

15. The system of clause 9, wherein the guard element includes at least a first guard element and a second guard element, each of the first guard element and the second guard element being axially coupled to the sub section by at least one fastener and at least one locking element.

16. The system of clause 9, wherein the guard element is axially coupled to the sub section with a second fastener and a second locking element the fastener and the second fastener and the locking element and the second locking element being located at different circumferential locations in the guard element.

17. The system of clause 9, further comprising an annular shoulder on the walls, wherein the normal vector of the annular shoulder is oriented parallel to the longitudinal axis of the sub section.

18. The system of clause 9, wherein the guard element is made from a first material and includes at least one passage, wherein the passage is filled with a second material different to the first material.

19. The system of clause 9, further comprising:
a flexible mount positioned radially between the guard element and the reduced diameter portion.

20. The system of clause 9, further comprising:
at least a portion of a sensor in the reduced diameter portion, wherein the at least a portion of a sensor is covered by the guard element.

21. The system of clause 9, wherein the guard element further comprises a lip extending radially into the reduced diameter portion.

22. The system of clause 9, wherein the sub section is formed from a first material, the system comprising:
an axial gap between the guard element and the sub section, the axial gap being filled with a second material different to the first material.

23. A method for covering a sensitive component in a downhole string, comprising:
positioning the sensitive component within a reduced diameter portion of the downhole string;
covering at least a portion of the sensitive component via a guard element, the guard element being arranged, at least partially, within the reduced diameter portion, the guard element having at least one pocket and at least one coupling extension, the at least one coupling extension extending radially into the reduced diameter portion from an inner surface of the guard element;
positioning the at least one coupling extension proximate to an aperture of a mounting section, the aperture receiving a locking element;
fastening the at least one coupling extension to the locking element via a fastener extending through the at least one coupling extension and a threaded hole of the locking element, the fastener being arranged within the pocket.

24. The method of clause 23, wherein a fastener axis is arranged parallel to a longitudinal axis of a sub section.

25. The method of clause 23, wherein the aperture includes a profile and the locking element includes a mating profile, wherein the mating profile corresponds to the profile of the aperture.

The foregoing disclosure and description of the disclosed embodiments is illustrative and explanatory of various embodiments of the present disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A system for covering a sensitive component in a downhole string, comprising:
a sub section in the downhole string including a longitudinal axis and a reduced diameter portion along the longitudinal axis;
a guard element arranged over the reduced diameter portion; and a mounting system adapted to axially couple the guard element to the sub section, comprising:
  a pocket in one of the sub section and the guard element, the pocket including a shoulder; and
  a threaded bore in the other of the sub section and the guard element, the threaded bore oriented at least partially parallel to the longitudinal axis of the sub section; and
  a fastener engaging the threaded bore through the pocket and axially coupling the guard element to the sub section.

2. The system of claim 1, further comprising:
a locking element, the locking element including an elongated body portion oriented at least partially along the longitudinal axis of the sub section and a head portion oriented at least partially perpendicular to the longitudinal axis of the sub section.

3. The system of claim 1, wherein a fastener axis and the threaded bore are arranged parallel to the longitudinal axis of the sub section.

4. The system of claim 1, wherein the pocket is in an outer surface of the sub section, and the mounting system further comprising:
  an aperture formed in the pocket, the aperture coupling the reduced diameter portion to the pocket, the aperture including a profile; and
  a locking element extending through the aperture, the locking element including a mating profile, wherein the mating profile corresponds to the profile of the aperture.

5. A system for covering a sensitive component in a downhole string, comprising:
  a sub section in the downhole string including a longitudinal axis and a reduced diameter portion along the longitudinal axis;
  a first guard element positioned within the reduced diameter portion, the first guard element comprising a first coupling extension extending radially from an inner surface of the first guard element, the first coupling extension comprising a threaded hole, the threaded hole at least partially parallel to the longitudinal axis;
  a second guard element positioned within the reduced diameter portion, the second guard element comprising a second coupling extension extending radially from an inner surface of the second guard element, the second coupling extension comprising a hole;
  a mounting section formed in the reduced diameter portion of the sub section, the mounting section including an aperture separated by walls; and
  a fastener positioned within a pocket, extending through the hole in the second coupling extension and the aperture and engaging the first coupling extension.

6. The system of claim 5, wherein the pocket is formed in one of the first guard element and the second guard element and a fastener axis is arranged parallel to the longitudinal axis of the sub section.

7. A system for covering a sensitive component in a downhole string, comprising:
  a sub section in the downhole string including a longitudinal axis and a reduced diameter portion along the longitudinal axis;
  a guard element, positioned within the reduced diameter portion comprising at least one pocket and at least one coupling extension, the at least one coupling extension extending radially from an inner surface of the guard element, the at least one coupling extension including a hole;
  a mounting section formed in the reduced diameter portion of the sub section, the mounting section including an aperture separated by walls;
  a locking element extending through the aperture, the locking element including a threaded hole at least partially parallel to the longitudinal axis; and
  a fastener positioned within the at least one pocket, extending through the hole in the at least one coupling extension, through the aperture and into the threaded hole of the locking element.

8. The system of claim 7, wherein the locking element comprises:
  an elongated body portion oriented at least partially along the longitudinal axis of the sub section; and
  a head portion oriented at least partially perpendicular to the longitudinal axis of the sub section.

9. The system of claim 7, wherein a fastener axis is arranged parallel to the longitudinal axis of the sub section.

10. The system of claim 7, wherein the aperture includes a profile and the locking element includes a mating profile, wherein the mating profile corresponds to the profile of the aperture.

11. The system of claim 7, wherein the sub section includes a circumference and the guard element covers at least a portion of the circumference of the sub section.

12. The system of claim 7, wherein the guard element includes at least a first guard element and a second guard element.

13. The system of claim 7, further comprising an annular shoulder on the walls, wherein a normal vector of the annular shoulder is oriented parallel to the longitudinal axis of the sub section.

14. The system of claim 7, wherein the guard element is made from a first material and includes at least one passage, wherein the at least one passage is filled with a second material different to the first material.

15. The system of claim 7, further comprising:
  a flexible mount positioned radially between the guard element and the reduced diameter portion.

16. The system of claim 7, further comprising:
  at least a portion of a sensor in the reduced diameter portion, wherein the at least a portion of a sensor is covered by the guard element.

17. The system of claim 7, wherein the sub section is formed from a first material, the system further comprising:
  an axial gap between the guard element and the sub section, the axial gap being filled with a second material different to the first material.

18. A method for covering a sensitive component in a downhole string, comprising:
  positioning the sensitive component within a reduced diameter portion of the downhole string;
  covering at least a portion of the sensitive component via a guard element, the guard element being arranged, at least partially, within the reduced diameter portion, the guard element having at least one pocket and at least one coupling extension, the at least one coupling extension extending radially into the reduced diameter portion from an inner surface of the guard element;
  positioning the at least one coupling extension proximate to an aperture of a mounting section, the aperture receiving a locking element;
  fastening the at least one coupling extension to the locking element via a fastener extending through the at least one coupling extension and a threaded hole of the locking element, the fastener being arranged within the at least one pocket.

19. The method of claim 18, wherein a fastener axis is arranged parallel to a longitudinal axis of the downhole string.

20. The method of claim 18, wherein the aperture includes a profile and the locking element includes a mating profile, wherein the mating profile corresponds to the profile of the aperture.

* * * * *